United States Patent
Hwang et al.

(10) Patent No.: US 12,086,433 B2
(45) Date of Patent: Sep. 10, 2024

(54) STORAGE DEVICE AND ELECTRONIC SYSTEM

(71) Applicant: SAMSUNG ELECTRONICS CO., LTD., Suwon-si (KR)

(72) Inventors: Jeangsu Hwang, Hwaseong-si (KR); Hyunsoo Cho, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 17/740,405

(22) Filed: May 10, 2022

(65) Prior Publication Data

US 2023/0112869 A1    Apr. 13, 2023

(30) Foreign Application Priority Data

Oct. 8, 2021 (KR) .......................... 10-2021-0133682

(51) Int. Cl.
*G06F 3/06* (2006.01)

(52) U.S. Cl.
CPC .......... *G06F 3/0631* (2013.01); *G06F 3/0604* (2013.01); *G06F 3/0679* (2013.01)

(58) Field of Classification Search
CPC ..... G06F 3/0631; G06F 3/0604; G06F 3/0679
See application file for complete search history.

(56) References Cited

U.S. PATENT DOCUMENTS

| | | | |
|---|---|---|---|
| 10,108,371 B2 | 10/2018 | Nimmagadda et al. | |
| 10,402,102 B2 | 9/2019 | Oh et al. | |
| 10,459,846 B2 | 10/2019 | Miyamoto et al. | |
| 10,782,915 B2 | 9/2020 | Kim et al. | |
| 11,036,640 B2 | 6/2021 | Lee et al. | |
| 2019/0146709 A1 | 5/2019 | Im et al. | |
| 2020/0098423 A1* | 3/2020 | Huang | G11C 11/419 |
| 2021/0073404 A1 | 3/2021 | Sakata et al. | |
| 2022/0229789 A1* | 7/2022 | Balakrishnan | G06F 13/4282 |
| 2024/0078039 A1* | 3/2024 | Sivasankaran | G06F 3/0673 |
| 2024/0094911 A1* | 3/2024 | Benisty | G06F 3/0611 |

* cited by examiner

*Primary Examiner* — Baboucarr Faal
(74) *Attorney, Agent, or Firm* — Muir Patent Law, PLLC

(57) ABSTRACT

An electronic system includes a host including a host memory; and a storage device storing data from the host, wherein the host allocates first and second host memory buffer (HMB) regions having different attributes in the host memory, and provides a host memory descriptor list (HMDL) including address information and attribute information of each of the first and second HMB regions to the storage device, the storage device buffers data in the first and second HMB regions with reference to the HMDL, and the host releases the first and second HMB regions, and provides data buffered in the first HMB region to the storage device and maintains data buffered in the second HMB region in the host memory, according to an attribute of each of the first and second HMB regions.

17 Claims, 25 Drawing Sheets

HMDL1

| HMB descriptor entry 1 |
|---|
| HMB descriptor entry 2 |
| HMB descriptor entry 3 |

FIG. 2B

HMDL1

| | Buffer Address | Buffer Size | Attribute |
|---|---|---|---|
| HMB1 | ADDR1 | SIZE1 | Normal |
| HMB2 | ADDR2 | SIZE2 | Preserve |
| HMB3 | ADDR3 | SIZE3 | Stream |

FIG. 4

HMDL2

| HMB descriptor entry 1 |
| HMB descriptor entry 2 |
| HMB descriptor entry 3 |
| HMB descriptor entry 4 |

FIG. 9B

HMDL2

| | Buffer Size | Buffer Address | Attribute |
|---|---|---|---|
| HMB1 | SIZE1 | ADDR1 | Volatile/Normal |
| HMB2 | SIZE2 | ADDR2 | Volatile/Preserve |
| HMB3 | SIZE3 | ADDR3 | Volatile/Stream |
| HMB4 | SIZE4 | ADDR4 | Non-volatile/Normal |

FIG. 10

HMDL3

| | Buffer Size | Buffer Address | Attribute |
|---|---|---|---|
| HMB1 | SIZE1 | ADDR1 | Volatile/Normal |
| HMB2 | SIZE2 | ADDR2 | Volatile/Preserve |
| HMB3 | SIZE3 | ADDR3 | Volatile/Stream |
| HMB4 | SIZE4 | ADDR4 | Non-volatile/Normal |
| HMB5 | SIZE5 | ADDR5 | Volatile/Host info. |
| HMB6 | SIZE6 | ADDR6 | Volatile/Debug |

FIG. 13

STORAGE DEVICE AND ELECTRONIC SYSTEM

CROSS-REFERENCE TO RELATED APPLICATION

This application claims benefit of priority to Korean Patent Application No. 10-2021-0133682, filed on Oct. 8, 2021, in the Korean Intellectual Property Office, the disclosure of which is incorporated herein by reference in its entirety.

BACKGROUND

1. Field

Embodiments relate to a storage device and an electronic system.

2. Description of the Related Art

Recently, various types of electronic devices have been used. Electronic systems provide services to users according to operations of various circuits and devices included therein. As an example, an electronic system may include a storage device for storing data handled by the electronic system. The storage device may store data or output stored data, and thus may provide a storage service to a user.

As various electronic systems are used by humans and a large amount of data is generated, a large amount of resources may be required to handle the data in a storage device. For example, when an amount of data increases, an amount of metadata associated with the data may also increase, and thus a memory having sufficient capacity may be required to buffer the data and the metadata. As another example, when an amount of data increases, a processor having high performance for operations may be required to process the data and process a large amount of operations.

However, for various reasons such as cost, device size, design limitations, or the like, it may be difficult to implement a storage device having sufficient resources. It may be beneficial to use a resource that already exists to provide sufficient resources for the storage device.

SUMMARY

According to an example embodiment, an electronic system includes a host including a host memory; and a storage device storing data from the host, wherein the host allocates first and second host memory buffer (HMB) regions having different attributes in the host memory, and provides a host memory descriptor list (HMDL) including address information and attribute information of each of the first and second HMB regions to the storage device, the storage device buffers data in the first and second HMB regions with reference to the HMDL, and the host releases the first and second HMB regions, and provides data buffered in the first HMB region to the storage device and maintains data buffered in the second HMB region in the host memory, according to an attribute of each of the first and second HMB regions.

According to an example embodiment, an electronic system includes a host including a host memory; and a storage device storing data from the host, wherein the host allocates first and second host memory buffer (HMB) regions having different attributes in the host memory, the storage device buffers data in the first and second HMB regions with reference to the attributes of the first and second HMB regions, and the host releases the first and second HMB regions, and selectively provides data buffered in the first and second HMB regions to the storage device, according to an attribute of each of the first and second HMB regions.

According to an example embodiment, a storage device includes a memory device; and a storage controller buffering data used for operation of the memory device in first and second host memory buffer (HMB) regions having different attributes, among HMB regions allocated from a host, wherein the storage controller acquires data buffered in the first HMB region in response to a command for disabling the HMB regions, and buffers the acquired data again in the first HMB region in response to a command for re-enabling the HMB regions, and uses data buffered in the first HMB region and data maintained in the second HMB region to control the memory device.

The HMB regions may further include a fourth HMB region having an attribute, different from the attributes of the first and second HMB regions. The storage controller may acquire data buffered in the first and second HMB regions from the host when an electronic system including the host and the storage device operation is terminated, buffer the acquired data again in the first and second HMB regions when the electronic system is booted, and use data buffered in the first and second HMB regions and data maintained in the fourth HMB region to control the memory device.

The HMB regions may further include a fifth HMB region having an attribute, different from the attributes of the first and second HMB regions. The storage device may further include a timer. The storage controller may stop an operation of the timer in a non-active mode, acquire a system time of the host from the fifth HMB region after converting from the non-active mode to an active mode, and synchronize a system time of the storage device with the system time of the host, based on the acquired system time.

The HMB regions may further include a sixth HMB region having an attribute, different from the attributes of the first and second HMB regions. The storage controller may generate log data when an error occurs in the storage device, store the log data in the sixth HMB region, and then terminate the storage device operation.

BRIEF DESCRIPTION OF DRAWINGS

Features will become apparent to those of skill in the art by describing in detail example embodiments with reference to the attached drawings in which:

FIGS. 2A to 2C are views illustrating data loaded into a host memory according to an example embodiment.

FIGS. 4 to 8B are views illustrating host memory buffer (HMB) regions having various attributes according to an example embodiment.

FIGS. 9A to 12B are views illustrating HMB regions having various attributes according to an example embodiment.

FIGS. 13 to 15 are views illustrating examples of an HMB region having a vendor-specific attribute.

DETAILED DESCRIPTION

Figure 1:
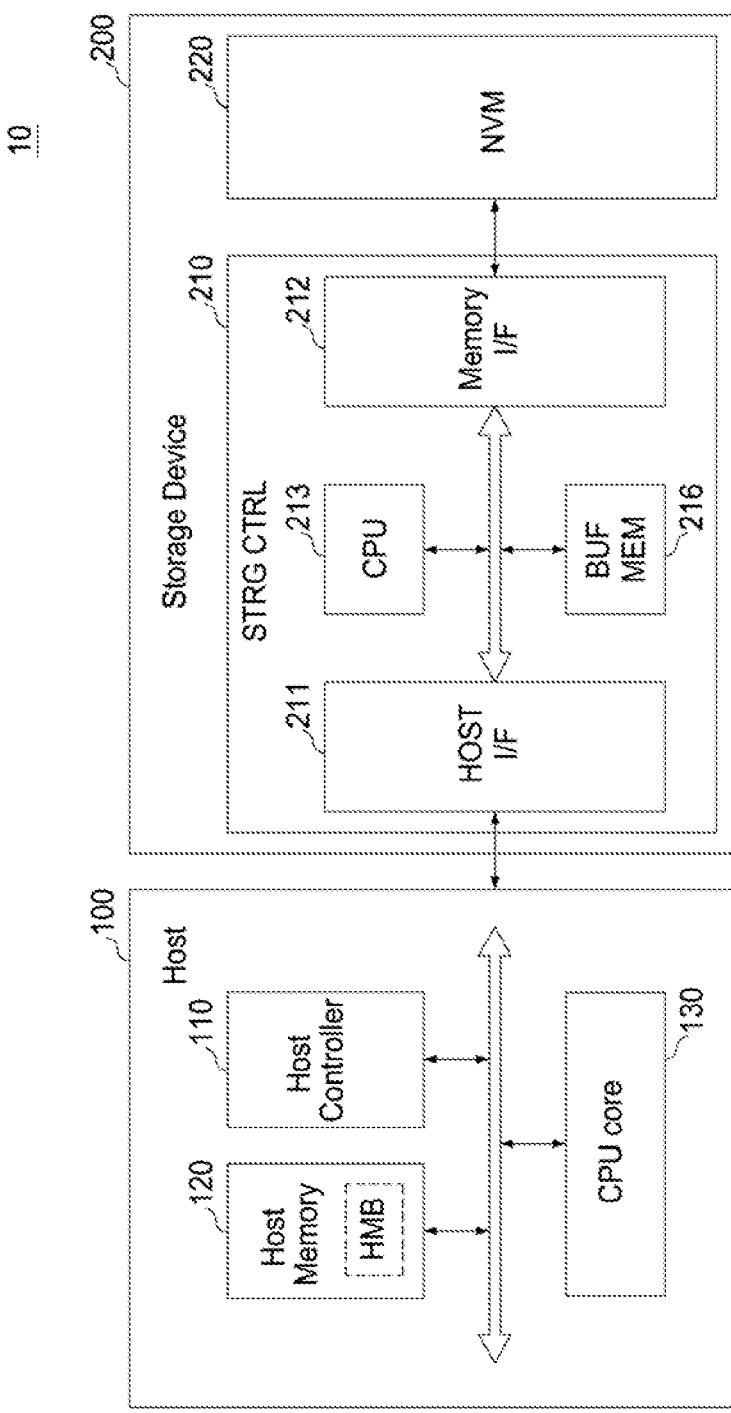
FIG. 1 illustrates a host-storage system according to an example embodiment.

FIG. 1 illustrates a host-storage system according to an example embodiment.

A host-storage system 10 may include a host 100 and a storage device 200. Also, the storage device 200 may include a storage controller 210 and a non-volatile memory (NVM) 220. The host 100 may include a host controller 110 and a host memory 120. The host memory 120 may function as a buffer memory for temporarily storing data to be transmitted to the storage device 200 or data transmitted from the storage device 200.

The storage device 200 may include storage media for storing data according to a request from the host 100. As an example, the storage device 200 may include at least one of a solid state drive (SSD), an embedded memory, and a removable external memory. When the storage device 200 is an SSD, the storage device 200 may be a device conforming to a non-volatile memory express (NVMe) standard. When the storage device 200 is an embedded memory or an external memory, the storage device 200 may be a device conforming to a universal flash storage (UFS) standard or an embedded multi-media card (eMMC) standard. The host 100 and the storage device 200 may generate and transmit a packet according to an adopted standard protocol, respectively.

When the non-volatile memory 220 of the storage device 200 includes a flash memory, the flash memory may include a 2D NAND memory array or a 3D (or a vertical) NAND (VNAND) memory array. As another example, the storage device 200 may include other various types of non-volatile memories. For example, in the storage device 200, a magnetic RAM (MRAM), a spin-transfer torque MRAM, a conductive bridging RAM (CBRAM), a ferroelectric RAM (FeRAM), a phase RAM (PRAM), a resistive memory, and various other types of memory may be applied.

The host controller 110 and the host memory 120 may be implemented as separate semiconductor chips. In another implementation, the host controller 110 and the host memory 120 may be integrated as the same semiconductor chip. As an example, the host controller 110 may be any one of a plurality of modules included in an application processor, and the application processor may be implemented as a system-on-chip (SoC). In addition, the host memory 120 may be an embedded memory provided in the application processor, or may be a non-volatile memory or a memory module disposed outside the application processor.

The host controller 110 may store data (e.g., write data) of a buffer region of the host memory 120 in the non-volatile memory 220, or may manage an operation of storing data (e.g., read data) of the non-volatile memory 220 in the buffer region.

A CPU core 130 may control an overall operation of the host 100. For example, the CPU core 130 may drive an operating system and an application, and may further drive a device driver for controlling the host controller 110.

The storage controller 210 may include a host interface 211, a memory interface 212, a central processing unit (CPU) 213, and a buffer memory 216. The storage controller 210 may further include a working memory (not illustrated) into which a flash translation layer (FTL) is loaded, and the CPU 213 may execute the flash translation layer to control operations of writing and reading data for the non-volatile memory 220.

The flash translation layer may perform various functions such as address mapping, wear-leveling, and garbage collection. The address mapping operation may be an operation of changing a logic address received from the host 100 into a physical address used to actually store data in the non-volatile memory 220. The wear-leveling may be a technique for preventing excessive degradation of a specific block by ensuring that blocks in the non-volatile memory 220 are used uniformly, and may be implemented by, for example, a firmware technique for balancing erase counts of physical blocks. The garbage collection may be a technique for securing usable capacity in the non-volatile memory 220 by copying valid data of an existing block to a new block and then erasing the existing block.

The host interface 211 may transmit and receive a packet to and from the host 100. A packet transmitted from the host 100 to the host interface 211 may include a command or data to be written to the non-volatile memory 220, or the like, and a packet transmitted from the host interface 211 to the host 100 may include a command or data read from the non-volatile memory 220, or the like. The host interface 211 may be implemented to comply with a standard protocol such as a peripheral component interconnect standard (PCI) express.

The memory interface 212 may transmit data to be written to the non-volatile memory 220 to the non-volatile memory 220, or may receive data read from the non-volatile memory 220. The memory interface 212 may be implemented to comply with a standard protocol such as a toggle or an open NAND flash interface (ONFI).

The buffer memory 216 may buffer various pieces of data used for an operation of the storage device 200. For example, the buffer memory 216 may buffer mapping data referenced to perform conversion between an address provided from the host 100 and a physical address on the non-volatile memory 220, error correction code (ECC) data referenced to detect and correct an error in data output from the non-volatile memory 220, state data related to a respective state of the non-volatile memory 220, or the like. For example, the buffer memory 216 may include a volatile memory, such as an SRAM, a DRAM, an SDRAM, or the like, and/or a non-volatile memory, such as a PRAM, an MRAM, an ReRAM, an FRAM, or the like.

Capacity of the buffer memory 216 provided in the storage device 200 may be limited for various reasons such as cost, device size, design limitations, or the like. Instead, when the buffer memory 216 uses a memory resource of the host memory 120 as a buffer, the storage device 200 may secure sufficient buffer memory capacity.

A region of the host memory 120 that the storage device 200 may use as a buffer may be referred to as a host memory buffer (HMB). The host 100 may allocate at least one HMB region, and may provide address information of the HMB region to the storage device 200. The storage device 200 may use the memory resource of the host memory 120 as a buffer by accessing the HMB region through the host interface 211, based on the address information acquired by the host 100.

A size of mapping data of the non-volatile memory 220 may tend to increase as capacity of the non-volatile memory 220 increases. The buffer memory 216 may not have sufficient capacity to buffer the mapping data. When a portion of the mapping data has to be loaded from the non-volatile memory 220, performance of the storage device 200 may be degraded. The storage device 200 may buffer at least a portion of the mapping data in the HMB region, and may acquire the mapping data from the buffer memory 216 or the HMB region. According to the trend for high speed of the host interface 211, it may take less time for the storage controller 210 to access the host memory 120 than to access the non-volatile memory 220. Therefore, when the storage controller 210 buffers the mapping data in the HMB region, performs address conversion using the mapping data, and accesses the non-volatile memory 220, read and write performance of the storage device 200 may be improved.

There may be a case in which the host 100 releases the allocated HMB region and then reallocates the HMB region. For example, the host 100 may release the HMB region at once while converting the storage device 200 to a non-active mode such as a power saving mode or a power off mode, may convert the storage device 200 from the non-active mode to an active mode, and may reallocate the HMB region.

Data stored in the HMB region before the HMB region is released may need to be reused after the HMB region is reallocated. For example, when the storage device 200 is switched to the non-active mode, the HMB region storing the mapping data may be released, but when the storage device 200 is switched to the active mode again, the mapping data may be used again.

When the storage device 200 needs to acquire data from the released HMB regions, store the acquired data in the non-volatile memory 220, and buffer the stored data in the HMB regions again after the HMB regions are reallocated, data traffic between the host 100 and the storage devices 200 may increase. When the data traffic between the host 100 and the storage device 200 increases, a period of time for the storage device 200 to convert to the non-active mode or the active mode may be increased.

Conversely, when data stored in all the released HMB regions are preserved in the host memory 120, instead of being provided to the storage device 200, data may occupy a region of the host memory 120 even though the HMB regions are not used. When unused data occupies a region of the host memory 120, insufficient capacity of the host memory 120 may be caused.

According to an example embodiment, the host 100 may give an attribute to each HMB region to be allocated. After the HMB region is released, data stored in the HMB region may be selectively maintained according to the attribute of the HMB region. If the data stored in the HMB region is maintained, when the HMB region is reallocated, the storage device 200 may use the maintained data as it is. Since the host 100 may selectively maintain only data necessary for being maintained among the data stored in the HMB regions when the HMB region is released at once, data traffic between the host 100 and the storage device 200 may be reduced, and the host memory 120 may be efficiently used.

According to an example embodiment, the host 100 may support an HMB region having various attributes in addition to an attribute indicating whether data is maintained even after the HMB region is released. For example, data generated by the host 100 may be stored in an HMB region corresponding thereto, instead of data from the storage device 200, according to an attribute of the HMB region. The host 100 may store data frequently updated by the host 100 in the corresponding HMB region, and may intermittently provide the stored data to the storage device 200, to reduce data traffic between the host 100 and the storage device 200, and prevent frequent writing of the non-volatile memory 220.

According to an example embodiment, the storage device 200 may use HMB regions having various attributes in a similar manner to a memory therein. The storage device 200 may separately store various pieces of data used for operation of the storage device 200 in HMB regions, and the data stored in the HMB regions may be handled in various manners according to attributes of the HMB regions. Therefore, various pieces of data used for operation of the storage device 200 may be effectively managed in the HMB regions.

Hereinafter, a host-storage system 10 according to example embodiments will be described in detail with reference to FIGS. 2A to 15.

Figure 2A:
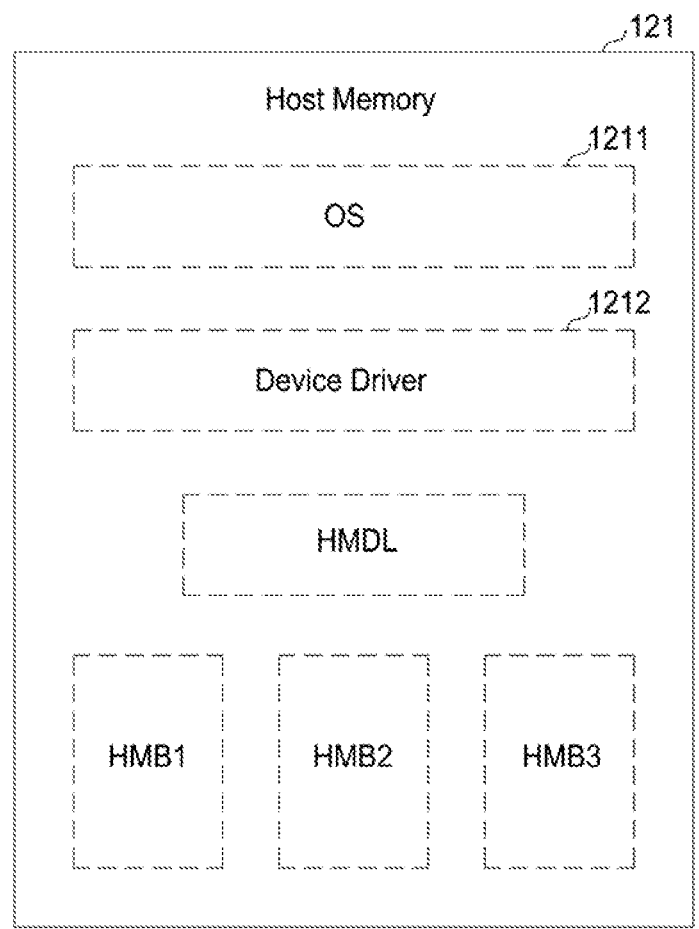
Figure 2C:
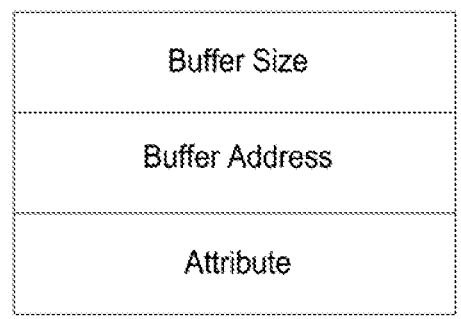

FIGS. 2A to 2C are views illustrating data loaded into a host memory according to an example embodiment.

A host memory 121 of FIG. 2A may correspond to the host memory 120 described with reference to FIG. 1.

An operating system 1211 and a device driver 1212 may be loaded into the host memory 121. The CPU core 130 may control an overall operation of the host 100 by driving the operating system 1211. In addition, the CPU core 130 may control a host controller 110 by driving the device driver 1212.

The CPU core 130 may manage resources of the host memory 121 by driving the operating system 1211. For example, the CPU core 130 may allocate a memory region necessary for driving an application in the host memory 121, and may determine a remaining memory region as an available memory region.

The CPU core 130 may allocate HMB regions HMB1, HMB2, and HMB3 in the available memory region by driving the device driver 1212. For example, the CPU core 130 may determine an address, a size, and an attribute of each of the HMB regions HMB1, HMB2, and HMB3. The CPU core 130 may determine a size and an attribute of each HMB region, based on requirements of the storage device 200 and a size of the available memory region. The CPU core 130 may generate and store in the host memory 121 a host memory descriptor list (HMDL) including address information, size information, and attribute information of each of the HMB regions HMB1, HMB2, and HMB3.

FIG. 2B illustrates information included in an HMDL.

The HMDL may include an HMB descriptor entry including address information, size information, and attribute information of each HMB region. In the example of FIG. 2B, a first HMDL HMDL1 includes three HMB descriptor entries, for each of HMB regions HMB1, HMB2, and HMB3.

FIG. 2C illustrates information included in an HMB descriptor entry.

In the example of FIG. 2C, the HMB descriptor entry includes buffer size information and buffer address information. The CPU core 130 may allocate a memory region having consecutive addresses as an HMB region. A buffer address may indicate the consecutive addresses of the HMB region. A buffer size may indicate a size of the HMB region having the consecutive addresses.

According to an example embodiment, an HMB descriptor entry may further include attribute information of an HMB region. According to an example embodiment, the HMB descriptor entry may have a size determined according to an NVMe specification. According to the NVMe specification, the HMB descriptor entry may include a buffer address region, a buffer size region, and a reserved region. Attribute information of the HMB region may be stored in the reserved region. Since the attribute information of the HMB region may be stored in the reserved region of the HMB descriptor entry, the HMDL may include attribute information of each of the HMB regions.

Figure 3:
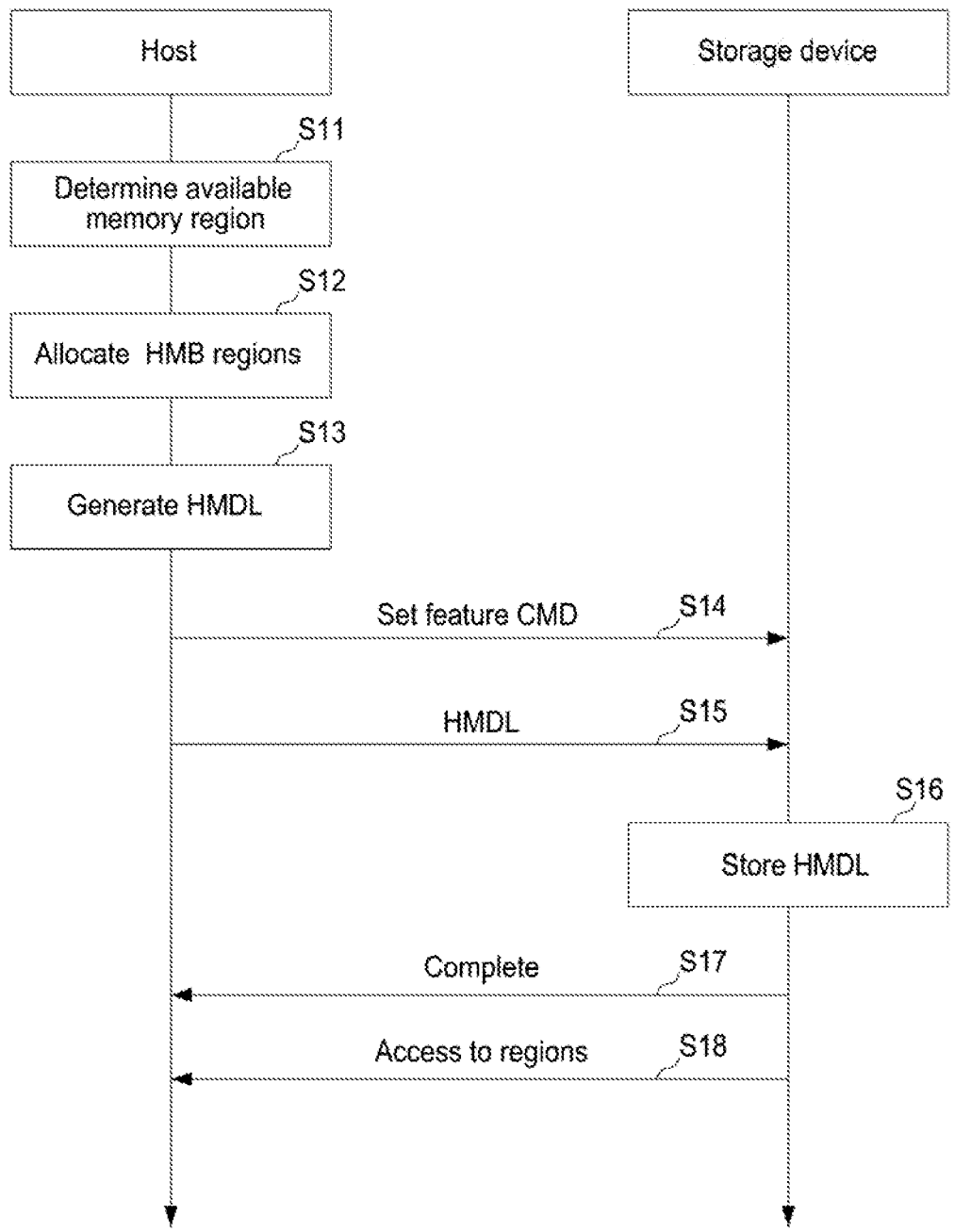
FIG. 3 is a view illustrating an operation of a host-storage system according to an example embodiment.

FIG. 3 is a view illustrating an operation of a host-storage system according to an example embodiment.

In S11, a host may determine an available memory region of a host memory.

In S12, the host may allocate HMB regions with reference to the determined available memory region, and may determine an attribute of each of the allocated HMB regions. According to an example embodiment, a buffer size, a buffer address, and an attribute of each of the HMB regions may be determined according to a request of a storage device.

In S13, the host may generate an HMDL including the buffer size, the buffer address, and the attribute of each of the allocated HMB regions, and may store the generated HMDL in a host memory.

In S14, the host may provide a set feature command for enabling an HMB to the storage device. While providing the set feature command to the storage device, the host may also provide address information of a region in which the HMDL is stored in the host memory.

In S15, the storage device may acquire an HMDL from the host memory with reference to the address information.

In S16, the storage device may store the acquired HMDL in a buffer memory therein.

Then, in S17, the storage device may provide a completion response to the host.

In S18, the storage device may access HMB regions having various attributes with reference to the HMDL acquired from the host memory. The storage device may perform an internal operation using data acquired from the HMB regions. For example, a storage controller may control a non-volatile memory using data acquired from the HMB regions.

Figure 5:
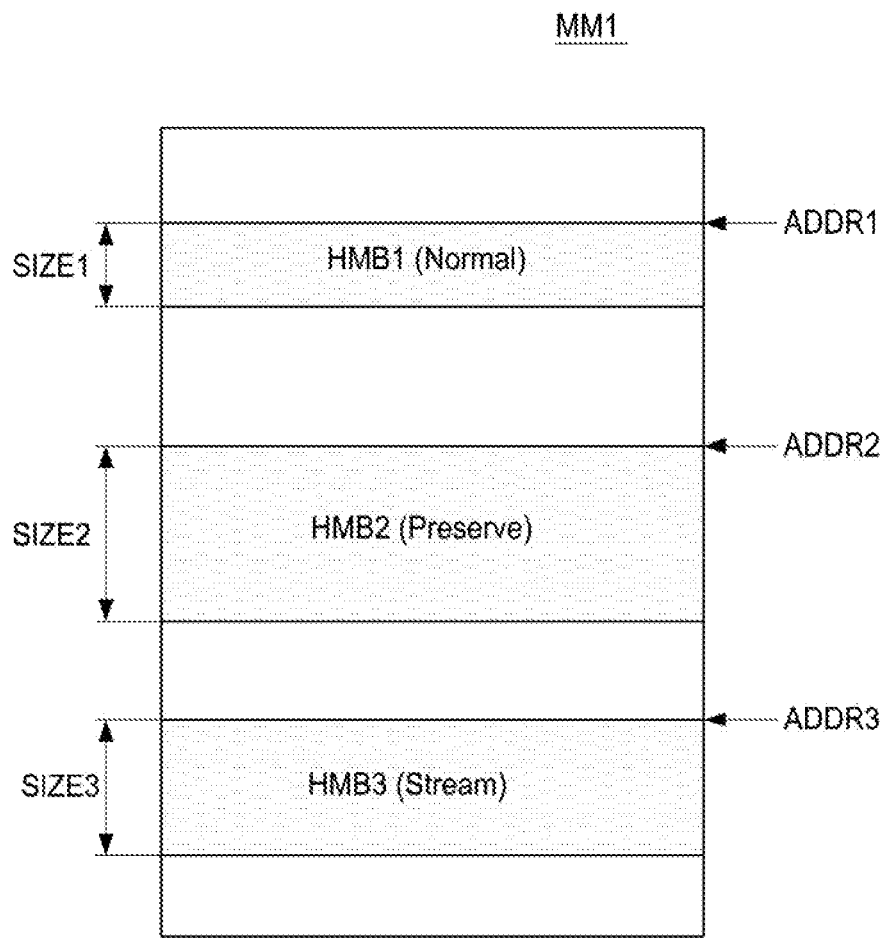

FIGS. 4 and 5 are views illustrating examples of information included in an HMDL according to allocation of HMB regions.

FIG. 4 illustrates buffer address information, buffer size information, and attribute information of HMB regions HMB1, HMB2 and HMB3 that may be included in a first HMDL HMDL1, in a table format. The HMB regions HMB1, HMB2, and HMB3 of FIG. 4 may correspond to the HMB regions HMB1, HMB2, and HMB3 illustrated in FIG. 2A.

FIG. 5 is a view illustrating a memory map of a host memory to which HMB regions are allocated. A first memory map MM1 represents a region to which the HMB regions HMB1, HMB2, and HMB3 are allocated in an address space of the host memory, and may correspond to the first HMDL HMDL1 of FIG. 4.

Referring to FIGS. 4 and 5, an address space that is continuous from a first address ADDR1 and has a first size SIZE1 may be allocated as a first HMB region HMB1, and the first HMB region HMB1 may have a normal attribute. Similarly, an address space that is continuous from a second address ADDR2 and has a second size SIZE2 may be allocated as a second HMB region HMB2, and the second HMB region HMB2 may have a preserve attribute. In addition, an address space that is continuous from a third address ADDR3 and has a third size SIZE3 may be allocated as a third HMB region HMB3, and the third HMB region HMB3 may have a stream attribute.

According to an example embodiment, when an HMB region having a normal attribute is released, data buffered in an HMB region corresponding thereto may not be maintained. When an HMB region having a normal attribute is released and then reallocated, it may not be necessary to have the same buffer address and buffer size as that of the previous HMB region, and any region of a host memory may be allocated. According to an example embodiment, a host may release the HMB region having the normal attribute and may then provide data buffered in the HMB region to a storage device. Then, when the HMB region is reallocated, the storage device may buffer data acquired from the host in the HMB region again.

When an HMB region having a preserve attribute is released, data buffered in an HMB region corresponding thereto may be maintained. When an HMB region having a preserve attribute is released and then reallocated, a memory region having the same buffer address and buffer size as that of the previous HMB region may be allocated, and a storage device may access the memory region to use buffered data as-is in the previous HMB region. The host may store buffer address information and buffer size information of the deallocated HMB region in a host memory, to allocate the HMB region having the preserve attribute again after being deallocated.

An HMB region having a stream attribute may be accessed not only by a storage device but also by a host. The host may store streaming data to be continuously generated (such as video data generated by a black box system) in the HMB region having the stream attribute, and the storage device may acquire the data stored in the HMB region periodically or according to conditions, to store the same in a non-volatile memory.

Figure 6:
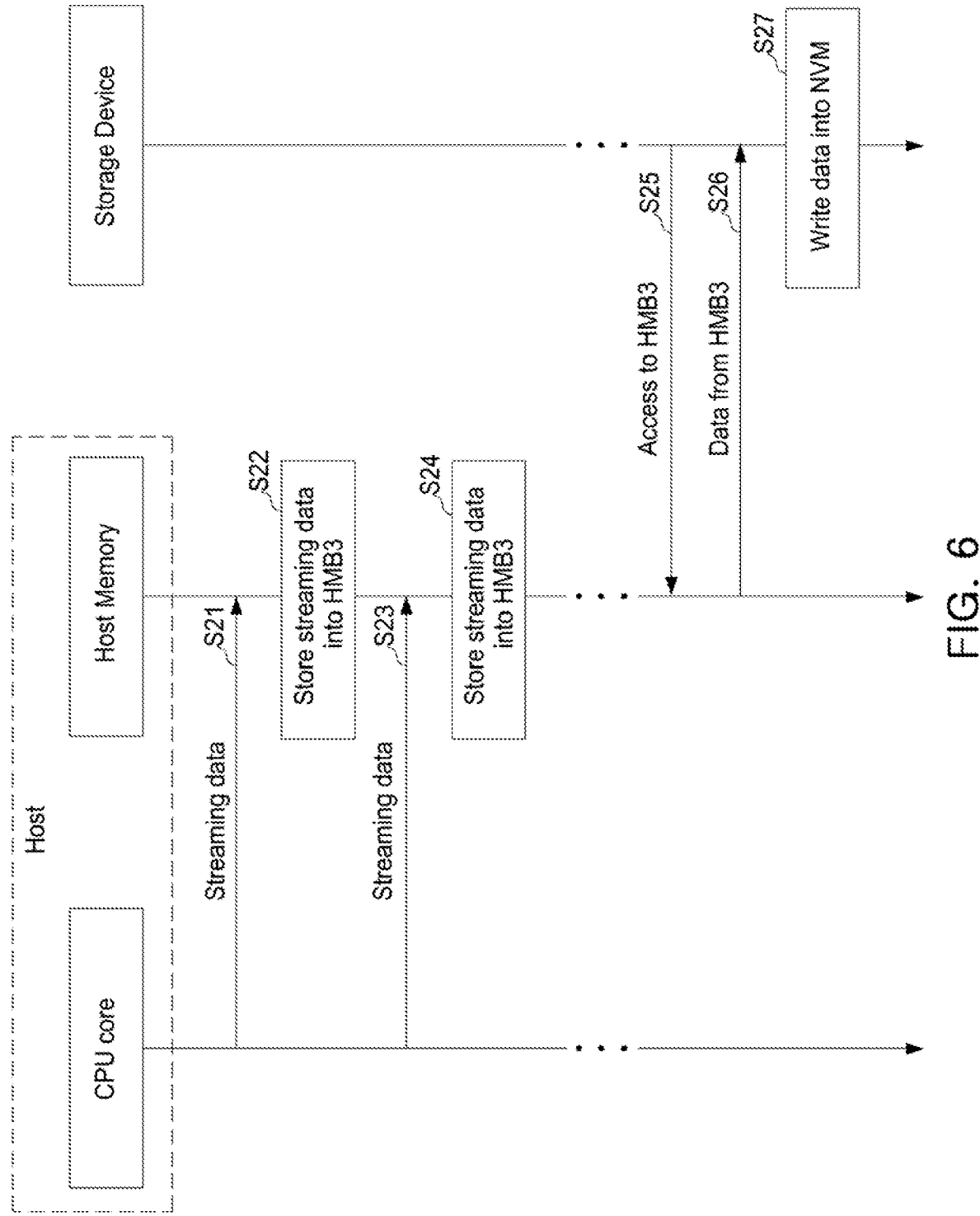

FIG. 6 is a view illustrating an operation of a host-storage system according to an example embodiment.

Specifically, an operation in which a storage device acquires streaming data from a host using an HMB region having a stream attribute will be described with reference to FIG. 6.

In S21, a host may generate streaming data. For example, when the host is a black box system including an imaging device, the CPU core 130 of the host may generate streaming data using frame data acquired from the imaging device.

In S22, the host may buffer streaming data in a third HMB region HMB3 with reference to an HMDL stored in a host memory.

Streaming data may be continuously generated. S23 and S24 indicate that the streaming data may be periodically generated and buffered in the third HMB region HMB3.

In S25 and S26, a storage device may access the third HMB region HMB3 periodically or according to conditions to acquire streaming data. For example, the storage device may access the third HMB region HMB3 in a second period, longer than a first period in which streaming data is generated. In addition, the storage device may access the third HMB region HMB3 before converting to a non-active state.

In S27, the storage device may store streaming data acquired from the third HMB region HMB3 in a non-volatile memory.

According to an example embodiment, since the storage device may access an HMB region at a relatively long cycle, to store streaming data generated by the host at a relatively short cycle therein, a frequency at which the host provides a command to the storage device may be reduced. Therefore, data traffic between the host and the storage device may be reduced.

Figure 7:
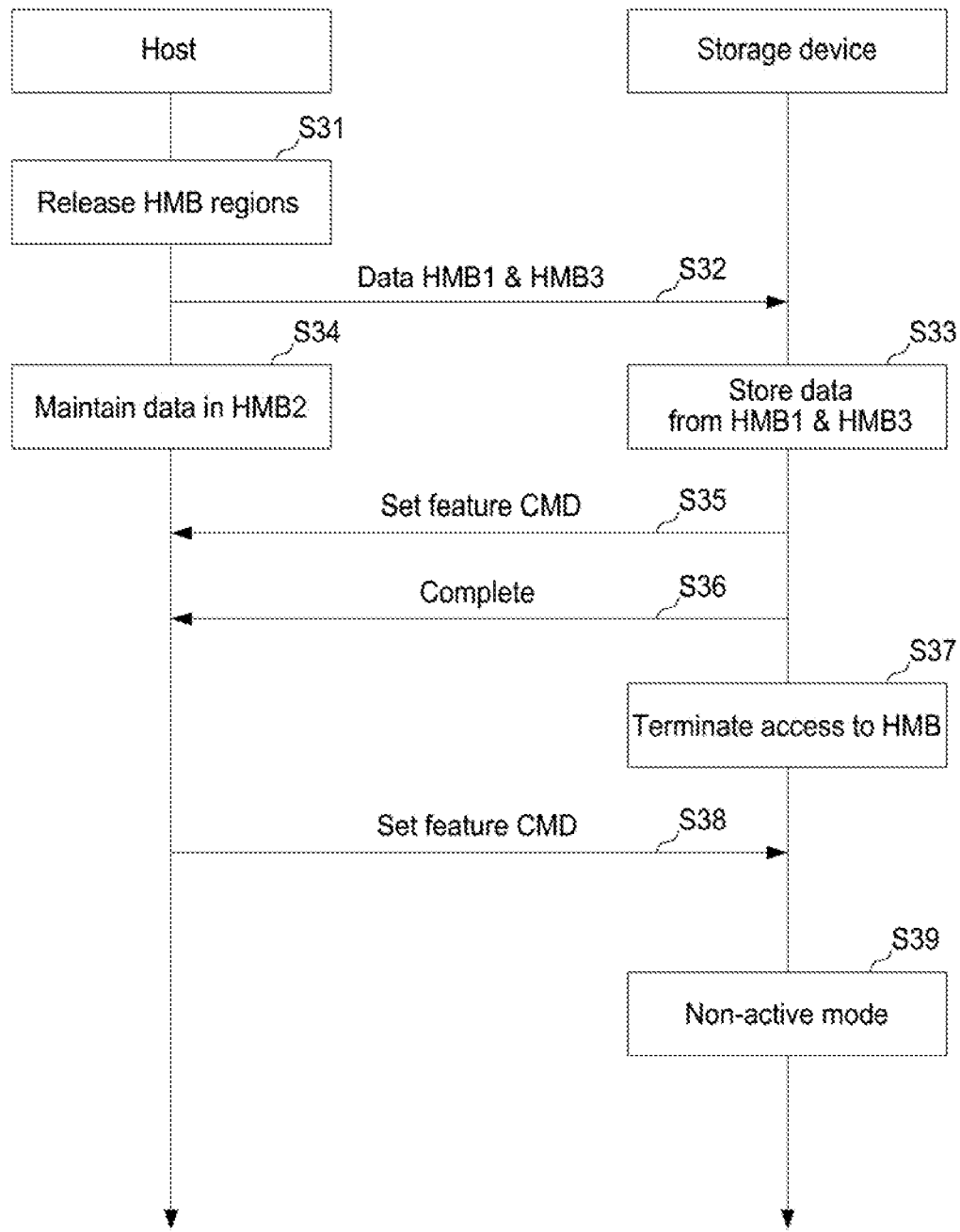

FIG. 7 is a view illustrating an operation of a host-storage system according to an example embodiment.

Specifically, FIG. 7 illustrates an operation in which a host collectively releases allocated HMB regions while converting a storage device to a non-active mode such as a power saving mode.

A host may convert a storage device from an active mode to a non-active mode when a predetermined condition is satisfied. For example, when the host does not provide an input/output command to the storage device for a predetermined time or more, the host may convert the storage device to the non-active mode. Before the host converts the storage device to the non-active mode, HMB regions may be released in S31.

In S32 to S34, the host may selectively maintain data stored in the HMB regions according to attributes of the HMB regions. Specifically, in S32, the host may provide data of a first HMB region HMB1 having a normal attribute and data of a third HMB region HMB3 having a stream attribute to the storage device, without maintaining them. In S33, the storage device may store the data of the first and third HMB regions HMB1 and HMB3 in a non-volatile memory therein. In S34, the host may maintain data of a second HMB region HMB2 having a preserve attribute.

In S35, the host may provide a set feature command for disabling an HMB to the storage device. The storage device may disable the HMB in response to the set feature command, and may provide a completion response to the host in S36.

In S37, the storage device may terminate access to the HMB region.

In S38, the host may provide a set feature command to the storage device to convert the storage device to a non-active mode.

In S39, the storage device may be switched to a non-active mode in response to the set feature command.

When the storage device is switched to the non-active mode, power may not be supplied to a buffer memory included in the storage device, and data in the buffer memory may be volatilized, e.g., lost. According to an example embodiment, even when the storage device is switched to the non-active mode, data in the HMB region having the preserve attribute may be maintained in a host memory.

The host may maintain buffer address information and buffer size information of the HMB region in the host memory even after the storage device is switched to the non-active mode. The host may reallocate the HMB region using the buffer address information and the buffer size information after the storage device is switched to the active mode. When the HMB region is reallocated, the storage device may access data in the HMB region maintained in the host memory.

Figure 8A:
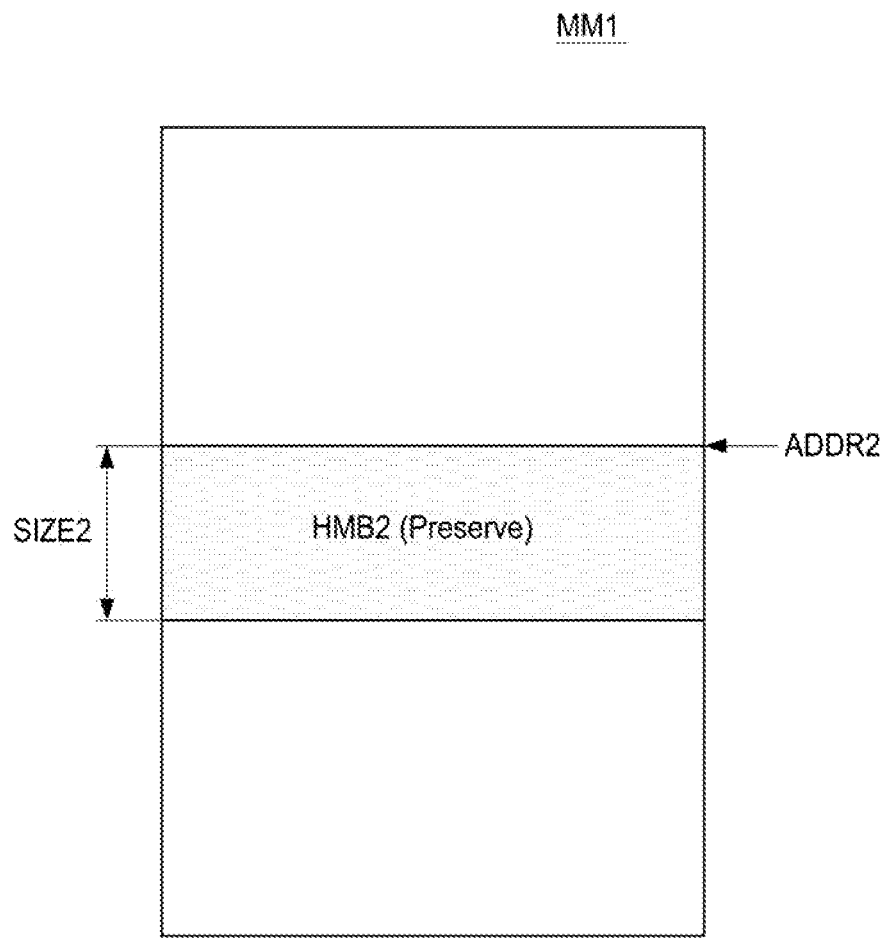
Figure 8B:
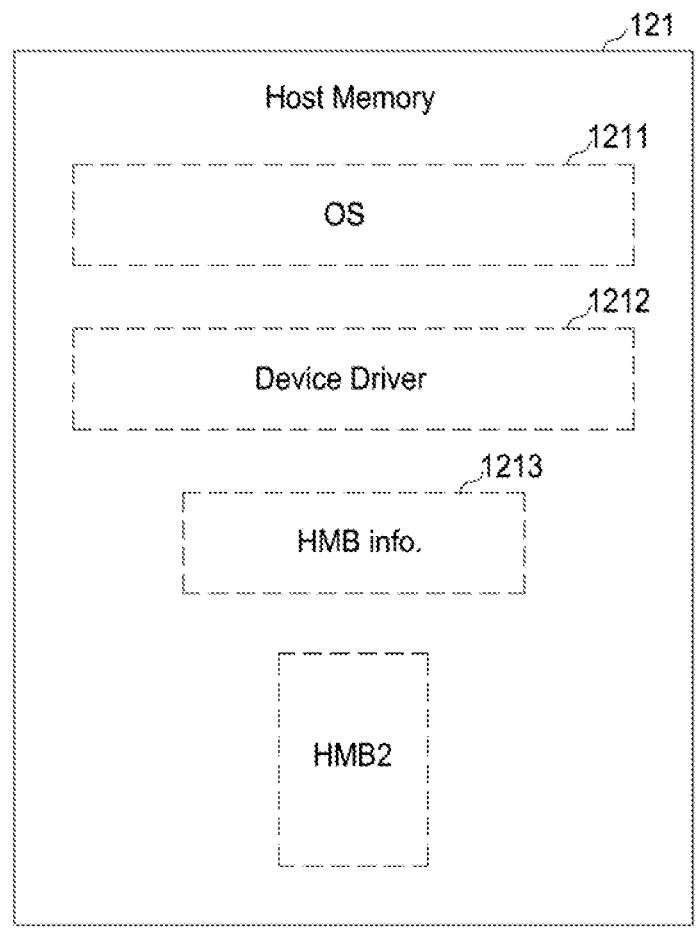

FIGS. 8A and 8B are views illustrating data stored in a host memory when a storage device is in a non-active mode.

FIG. 8A illustrates a memory map of a host memory when a storage device is in a non-active mode. Comparing the first memory map MM1 of FIG. 5 and a first memory map MM1 of FIG. 8A, after HMB regions HMB1, HMB2, and HMB3 are released, data of a first HMB region HMB1 having a normal attribute and data of a third HMB region HMB3 having a stream attribute may not be maintained, whereas data of a second HMB region HMB2 having a preserve attribute may be maintained in a memory region having a second size SIZE2 from a second address ADDR2.

FIG. 8B illustrates data stored in a host memory when a storage device is in a non-active mode. In a similar manner to those described with reference to FIG. 2A, an operating system 1211 and a device driver 1212 may be loaded into a host memory 121. Also, as described with reference to FIG. 8A, the data of the second HMB region HMB2 having the preserve attribute may be maintained in the host memory 121. In addition, the host memory 121 may further store HMB information 1213 including buffer address information and buffer size information of the second HMB region HMB2.

In FIGS. 7 to 8B, the data stored in the third HMB region HMB3 having the stream attribute is illustrated as not being maintained in the host memory when the storage device is in the non-active mode. However, when the storage device is in the non-active mode, the data stored in the HMB region having the stream attribute may be maintained without being removed from the host memory.

After the storage device is switched from the non-active mode to the active mode, the host may reallocate the second HMB region HMB2 having the preserve attribute, with reference to the HMB information 1213. A buffer address and a buffer size of the previously allocated second HMB region HMB2 may be equal to a buffer address and a buffer size of the reallocated second HMB region HMB2. The storage device may use data stored in the second HMB region HMB2, before being switched to the non-active mode even after being switched from the non-active mode to the active mode. For example, after the storage device is switched to the active mode, a storage controller may access a non-volatile memory by using mapping data maintained in a preserve region without loading the mapping data from the non-volatile memory.

Figure 9A:
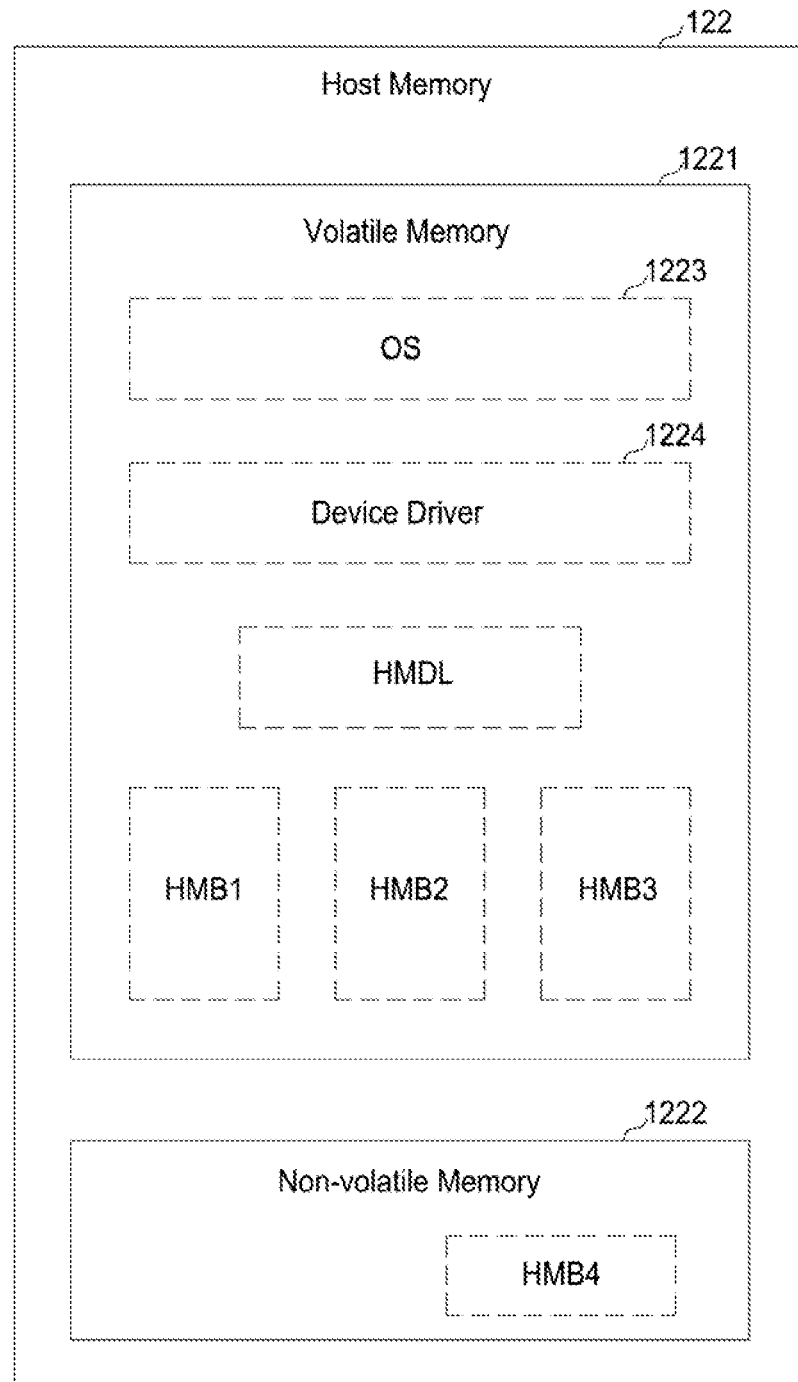

FIGS. 9A and 9B are views illustrating data stored in a host memory according to an example embodiment.

A host memory 122 of FIG. 9A corresponds to the host memory 120 described with reference to FIG. 1.

According to an example embodiment, the host memory 122 may include a volatile memory 1221 and a non-volatile memory 1222. The volatile memory 1221 may be implemented as SRAM, DRAM, SDRAM, or the like, and the non-volatile memory 1222 may be implemented as PRAM, MRAM, ReRAM, FRAM, or the like. The non-volatile memory 1222 may retain data even when power is not supplied to the host 100.

An operating system 1223 and a device driver 1224 may be loaded into the volatile memory 1221. The CPU core 130 may manage resources of the host memory 122 by driving the operating system 1223.

The CPU core 130 may allocate an available memory region of the host memory 122 to HMB regions HMB1 to HMB4 by driving the device driver 1224. In the example of FIG. 9A, a memory region in the volatile memory 1221 may be allocated as first to third HMB regions HMB1, HMB2, and HMB3, and a memory region in the non-volatile memory 1222 may be allocated as a fourth HMB region HMB4. The CPU core 130 may generate an HMDL including buffer address information, buffer size information, and attribute information of each of the HMB regions HMB1 to HMB4, and store the same in the host memory 122.

FIG. 9B illustrates information that may be included in an HMDL. In the example of FIG. 9B, a second HMDL HMDL2 may include HMB descriptor entries for each HMB regions HMB1 to HMB4. In a similar manner to that described with reference to FIG. 2C, each of the HMB descriptor entries of FIG. 9B may include buffer address information, buffer size information, and attribute information of an HMB region corresponding thereto.

Figure 11:
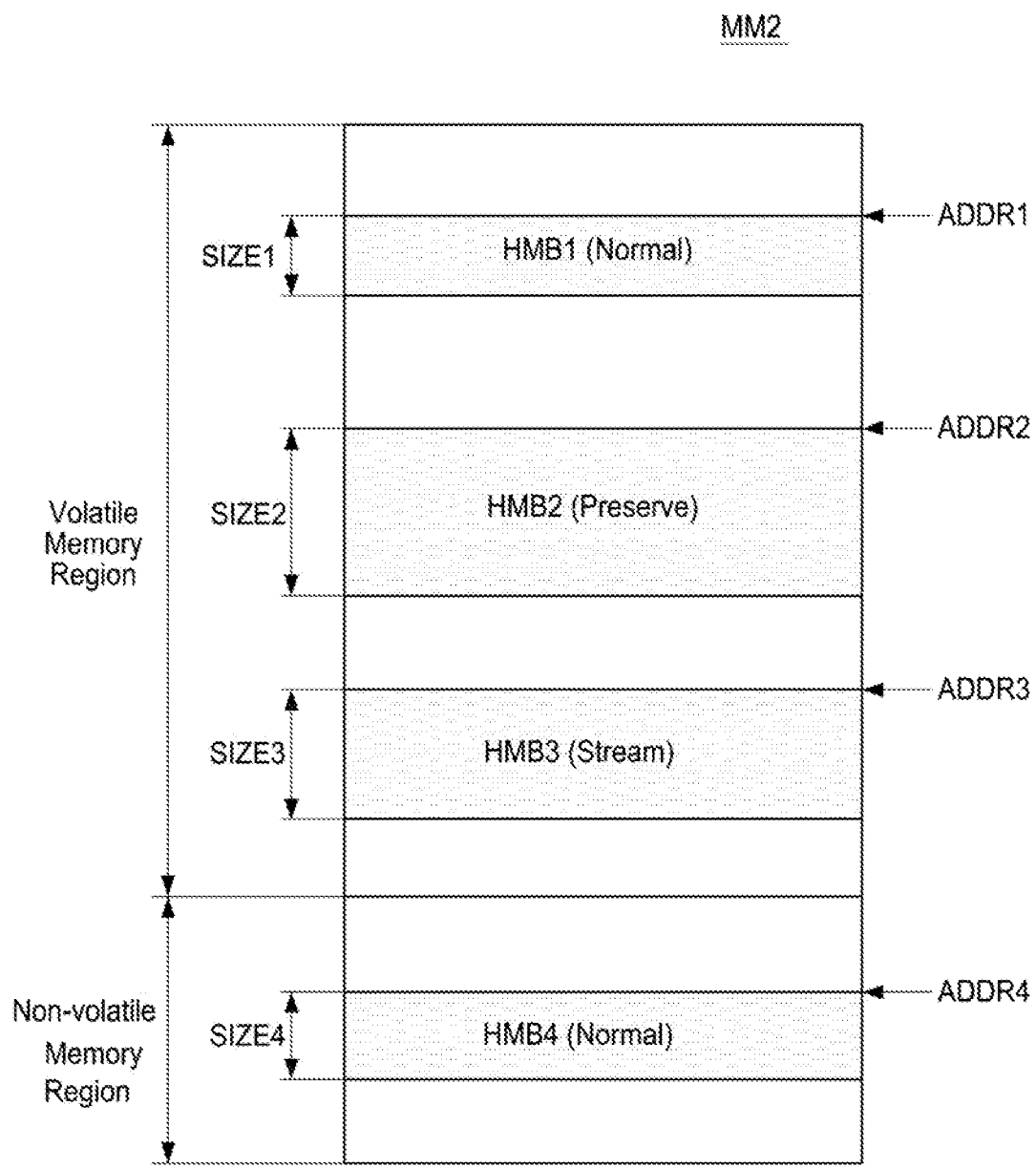

FIGS. 10 and 11 are views illustrating examples of attribute information included in an HMDL according to allocation of HMB regions.

FIG. 10 illustrates buffer address information, buffer size information, and attribute information that may be included in a second HMDL HMDL2 in a table format. HMB regions HMB1 to HMB4 of FIG. 10 may correspond to the HMB regions HMB1 to HMB4 illustrated in FIG. 9A.

FIG. 11 is a view illustrating a memory map of a host memory to which HMB regions are allocated.

According to an example embodiment, the CPU core 130 may manage the volatile memory 1221 and the non-volatile memory 1222 using one memory map. For example, a second memory map MM2 may include a volatile memory region and a non-volatile memory region.

Referring to FIGS. 10 and 11, a first HMB region HMB1 may have a volatile-normal attribute, a second HMB region HMB2 may have a volatile-preserve attribute, and a third HMB region HMB3 may have a volatile-stream attribute. The HMB regions HMB1, HMB2, and HMB3 may be allocated to have the same buffer address and buffer size as those described with reference to FIGS. 4 and 5. In addition, the volatile-normal attribute, the volatile-preserve attribute, and the volatile-stream attribute of the HMB regions HMB1, HMB2, and HMB3 may be the same as the normal attribute, the preserve attribute, and the stream attribute, described with reference to FIG. 4.

A fourth HMB region HMB4 may have a non-volatile-normal attribute. The HMB region having the non-volatile-normal attribute may be allocated in the non-volatile memory region. Even when the HMB region having the non-volatile-normal attribute is released, data stored in an HMB region corresponding thereto may be maintained. A storage device may buffer various pieces of data used for an operation of the storage device in the HMB regions HMB1 to HMB4, based on the attributes of the HMB regions HMB1 to HMB4.

According to an example embodiment, even when a host-storage system is powered off, data stored in the HMB region having the non-volatile-normal attribute may be maintained. After the host-storage system is powered on again, a host may reallocate the HMB region having the non-volatile-normal attributes, and the storage device may access the reallocated HMB region to use data stored in the HMB region as it is, before the host-storage system is powered off.

According to an example embodiment, after the host-storage system is powered on, the host may be deallocated, when the host-storage system is powered off, to reallocate the HMB region having the non-volatile-normal attributes. The buffer address and buffer size information of the HMB region may be stored in the non-volatile memory 1222.

Figure 12A:
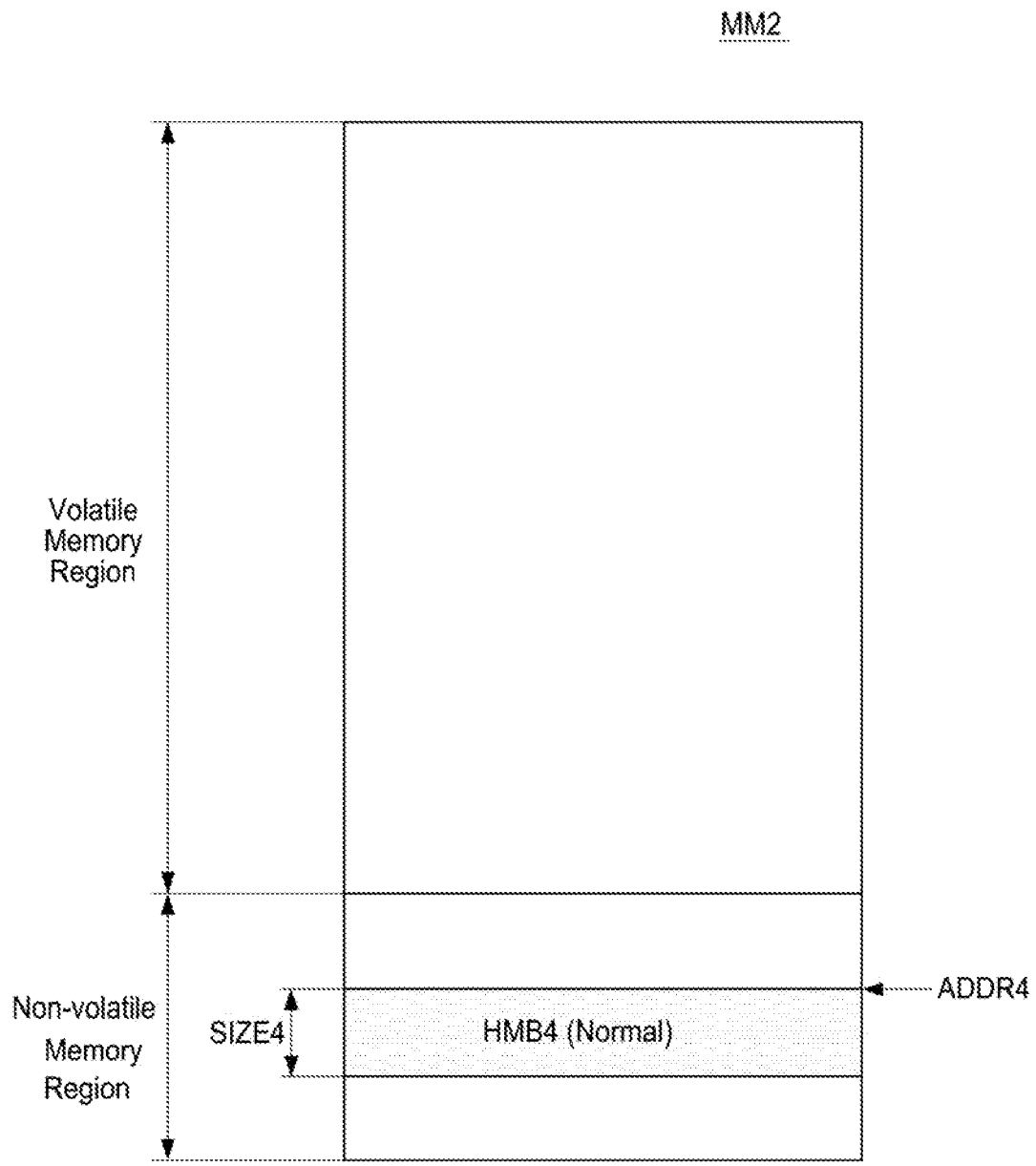
Figure 12B:
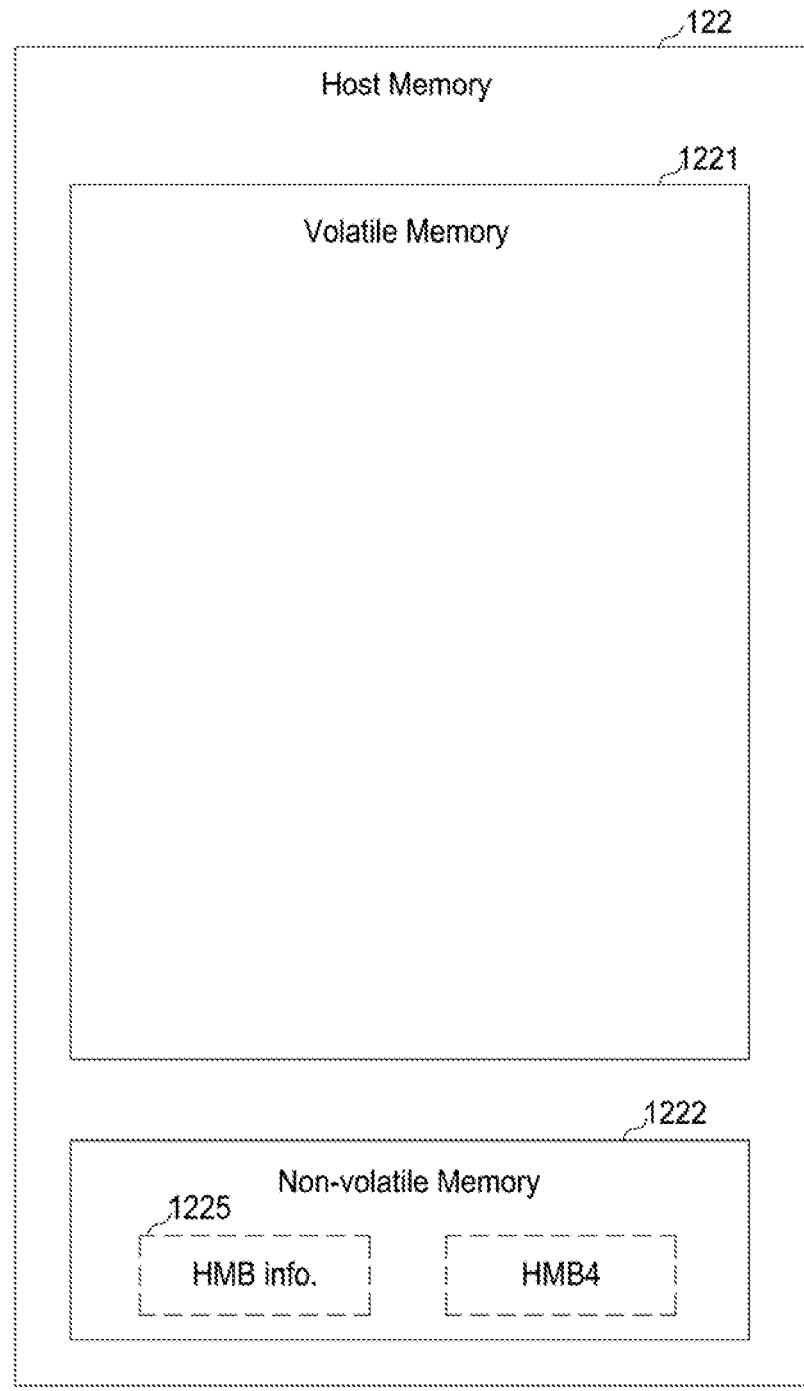

FIGS. 12A and 12B are views illustrating data stored in a host memory when a host-storage system is in a power-off state.

FIG. 12A illustrates a memory map of a host memory when a host-storage system is in a power-off state. Comparing the second memory map MM2 of FIG. 11 and a second memory map MM2 of FIG. 12A, after the host-storage system is powered off, data of HMB regions HMB1 to HMB4 may not be maintained, whereas data of a fourth HMB region HMB4 having a non-volatile-normal attribute and stored in a non-volatile memory 1222 may be maintained in a memory region having a fourth size SIZE4 from a fourth address ADDR4.

FIG. 12B illustrates data stored in a host memory when a host-storage system is in a power-off state. After a host-storage system is powered off, data including the operating system 1223 and the device driver 1224 may be removed from the volatile memory 1221. Data of a fourth HMB region HMB4 having a non-volatile-normal attribute may be maintained in the non-volatile memory 1222. In addition, the host memory 122 may further store HMB information 1225 including buffer address information and buffer size information of the fourth HMB region HMB4 in the non-volatile memory 1222.

After the host-storage system is powered on, in order to allocate the HMB region to a storage device, the fourth HMB region HMB4 having the non-volatile-normal attribute may be reallocated with reference to the HMB information 1225. A buffer address and a buffer size of the previously allocated fourth HMB region HMB4 may be equal to a buffer address and a buffer size of the reallocated fourth HMB region HMB4. Therefore, the storage device may control a memory device therein using data maintained in the fourth HMB region HMB4.

According to an example embodiment, the storage device may store operation data for driving the storage device in the fourth HMB region HMB4 having the non-volatile-normal attribute. A storage controller may access the fourth HMB region HMB4 faster, as compared to a non-volatile memory in the storage device. According to the trend for high speed of a host interface such as a PCI Express, a speed at which the storage device accesses the fourth HMB region HMB4 may further increase. Since the storage device quickly acquires operation data from the fourth HMB region HMB4 when the storage device is powered on, a period of time taken for the power-on operation of the storage device may be reduced.

According to an example embodiment, the host device may relax a condition for putting the storage device into a power saving mode or powering it off in order to reduce power consumption of the host-storage system. Even when the storage device is in the non-active state, the storage device may acquire operation data stored in the fourth HMB region HMB4 and may quickly convert to the active state. Therefore, the host device may improve power efficiency while minimizing performance degradation of the host-storage system.

According to an example embodiment, the host may further provide HMB regions having a vendor-specific attribute as well as the attributes described with reference to FIGS. 10 to 12B. The host may provide improved performance to the storage device by providing HMB regions having various attributes.

Hereinafter, examples of an HMB region having a vendor-specific attribute may be described with reference to FIGS. 13 to 15.

Unlike the examples described with reference to FIGS. 10 to 12B, in examples of FIGS. 13 to 15, fifth and sixth HMB regions HMB5 and HMB6 may be further allocated in the host memory 122, in addition to first to fourth HMB regions HMB1 to HMB4.

FIG. 13 illustrates a third HMDL HMDL3 storing information of the HMB regions HMB1 to HMB6 in table format.

Referring to FIG. 13, the first to fourth HMB regions HMB1 to HMB4 may have the same attributes as those described with reference to FIGS. 10 to 12B.

The fifth HMB region HMB5 may have a volatile-host information attribute as a vendor-specific attribute. According to an example embodiment, a host may continuously update system information of the host in the HMB region having the volatile-host information attribute. A storage device may acquire system information of the host by accessing the HMB region, and may operate in synchronization with the host using the acquired system information.

The sixth HMB region HMB6 may have a volatile-debug attribute as a vendor-specific attribute. According to an example embodiment, the storage device may store log data for debugging the storage device in the HMB region having the volatile-debug attribute.

Figure 14:
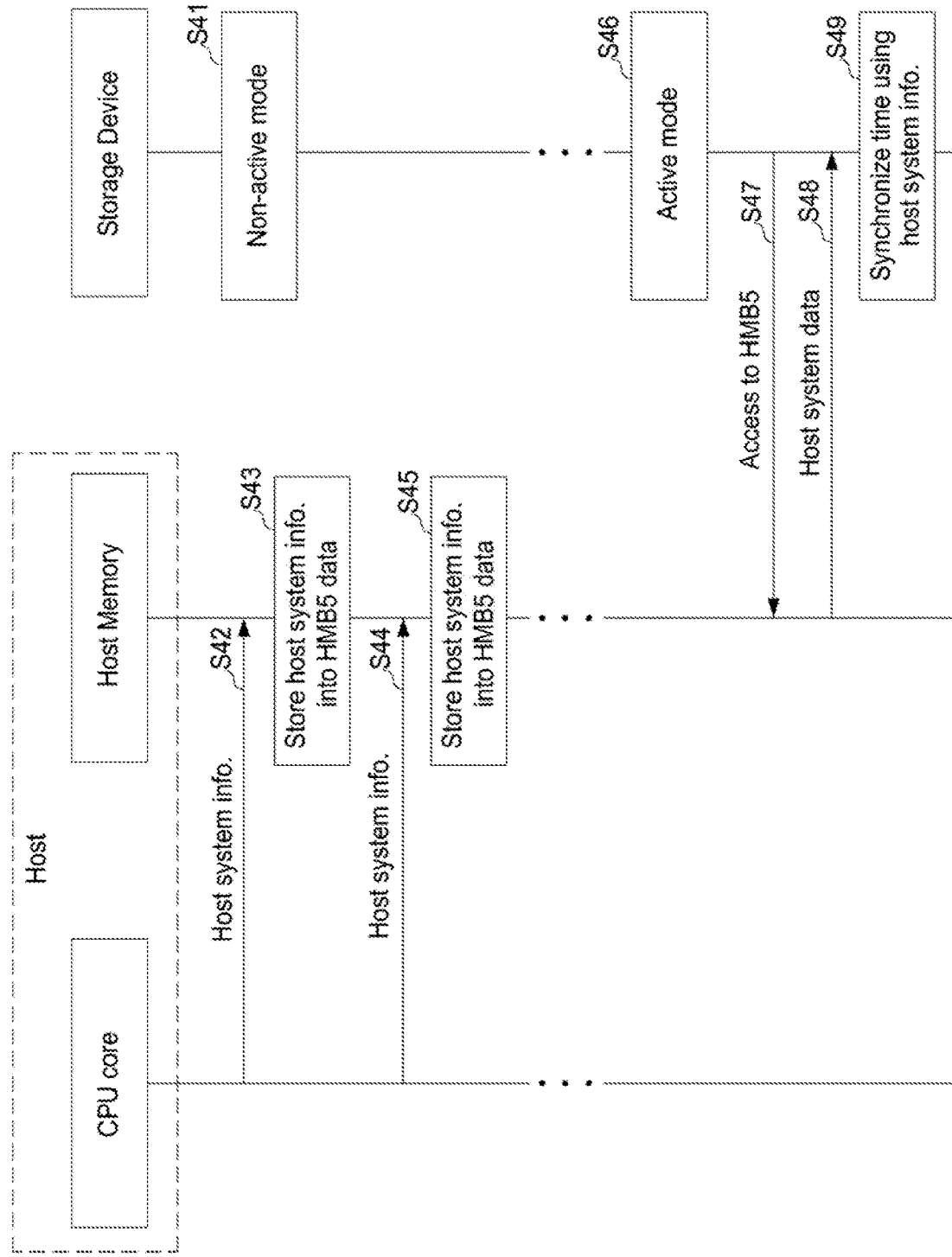

FIG. 14 is a view illustrating an operation of a host-storage system according to an example embodiment.

Specifically, FIG. 14 describes a method of synchronizing a storage device with a host using an HMB region having a volatile-host information attribute.

In S41, the storage device may be switched to a non-active mode such as a power saving mode. The storage device may stop an operation of a timer therein for determining a system time while entering the non-active mode.

The host may maintain an active state even when the storage device is in the non-active mode. When the timer in the storage device does not operate in the non-active mode, the system time of the storage device may not match a system time of the host after the storage device is switched back to the active mode.

While the storage device is in the non-active mode, the host may perform S42 to S45.

In S42, a CPU core of the host may provide system information of the host to a host memory.

In S43, the host memory may store the system information in a fifth HMB region HMB5. For example, the host may store a system time generated using a real time clock (RTC) or the like therein in the fifth HMB region HMB5. The system information of the host may be continuously changed, and the changed system information may be continuously updated in the fifth HMB region HMB5.

S44 and S45 indicate that the host updates the changed system information in the fifth HMB region HMB5.

In S46, the storage device may be switched from the non-active mode to the active mode.

In S47 and S48, the storage device may access the fifth HMB region HMB5 to acquire the system information of the host.

Then, in S49, the storage device may synchronize the system time therein with a host system time, based on the system information from the host.

According to an example embodiment, the storage device may operate based on the synchronized system time by acquiring the system time from the host using the HMB region even when the timer is not operated in the non-active mode. Therefore, power consumption of the storage device in the non-active mode may be further reduced, and time accuracy of operation of the storage device may be improved.

Figure 15:
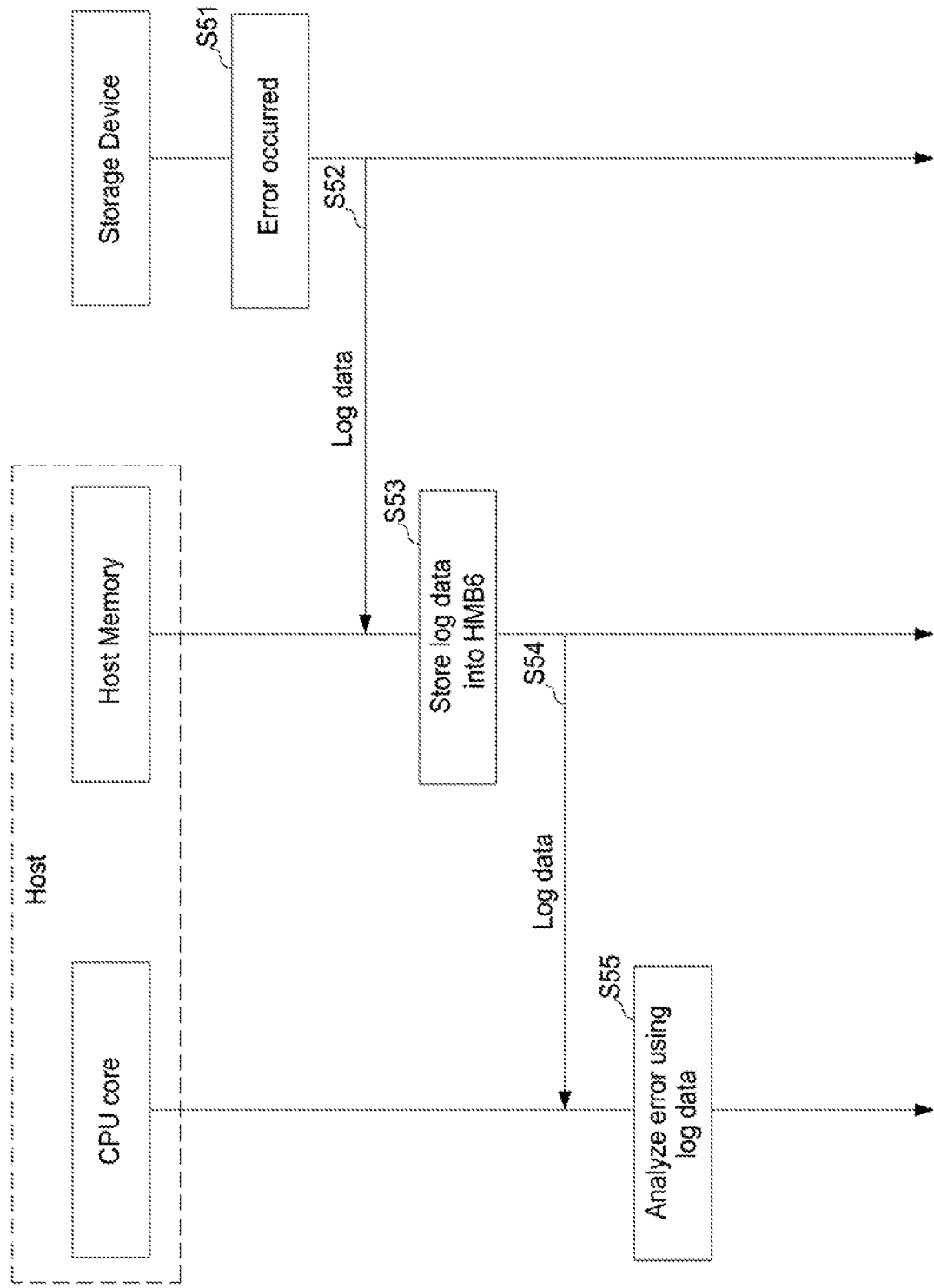

FIG. 15 is a view illustrating an operation of a host-storage system according to an example embodiment.

Specifically, FIG. 15 describes a method in which a storage device stores log data using an HMB region having a volatile-debug attribute.

In S51, an error may occur in a storage device. The storage device may generate log data including information on an error for debugging.

In S52 and S53, the storage device may store the log data in a sixth HMB region HMB6. Then, the storage device operation may be terminated.

In S54, a CPU core may acquire the log data stored in the sixth HMB region HMB6.

In S55, the CPU core may perform debugging of the storage device, e.g., the CPU core may analyze the error occurring in the storage device using the acquired log data.

According to an example embodiment, since the storage device stores the log data in the HMB region, the log data may be maintained even when the storage device operation is terminated, and a host may acquire the log data from the HMB region in the termination state of the storage device without booting the storage device.

Although the volatile-host information attribute and the volatile-debug attribute are exemplified as vendor-specific attributes in FIGS. 13 to 15, the host may allocate a non-volatile memory region included in the host memory as an HMB region for storing system information or an HMB region for storing log data. In addition, the host may allocate an HMB region having different vendor-specific attributes to a volatile memory region or a non-volatile memory region of a host memory.

According to an example embodiment, the host may allocate a plurality of HMB regions for the storage device, and may allocate attributes to each of the HMB regions. When the HMB regions are released, data stored in the HMB regions may be selectively maintained according to attributes of HMB regions corresponding thereto. When the storage device enters the non-active state, the plurality of HMB regions may be released at once, but the host may maintain some data in the HMB regions, to reduce data traffic between the host and the storage device and improving performance of the storage device.

Hereinafter, a system to which an HMB may be applied according to an example embodiment will be described in detail with reference to FIGS. 16 to 20.

Figure 16:
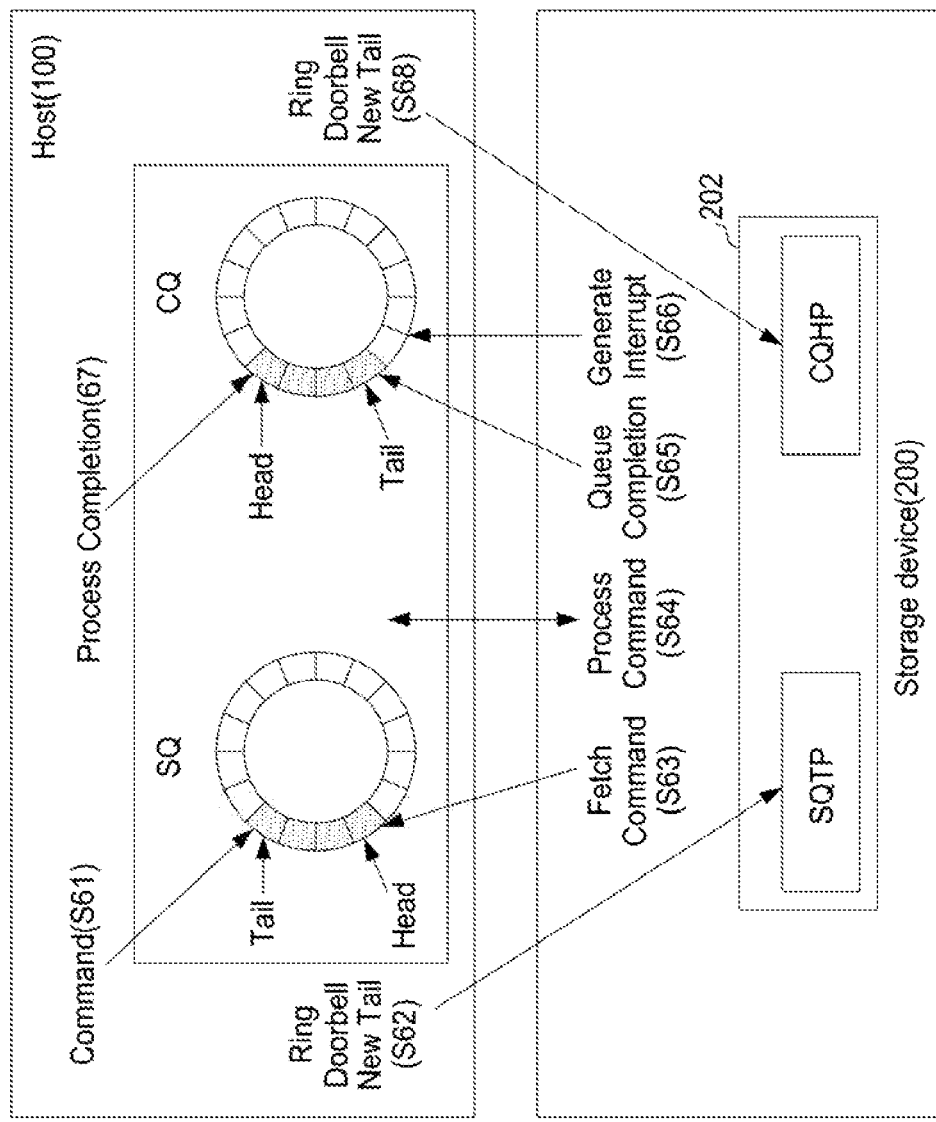
FIGS. 16 to 20 are views illustrating a system to which an HMB is applied, according to an example embodiment.

FIG. 16 is a view illustrating an interface between the host 100 and the storage device 200.

The host 100 and the storage device 200 of FIG. 16 may correspond to the host 100 and the storage device 200 described with reference to FIG. 1.

The storage device 200 may communicate with host 100 using a command queue interface that supports a protocol such as NVMe. The command queue interface may use a queue pair including a submission queue (SQ) for inputting a requested command and a completion queue (CQ) for recording a processing result of a command corresponding thereto, to support interfacing between the host 100 and the storage device 200.

The host 100 may create the queue pair. According to an example embodiment, the queue pair may be stored in the host memory 120.

The storage device 200 may include a doorbell register 202 to perform an operation of the command queue interface. The doorbell register 202 may be a register for controlling the queue pair generated by the host 100. The doorbell register 202 may store a submission queue tail pointer (SQTP) and a completion queue head pointer (CQHP).

In S61, the host 100 may queue a command in a submission queue SQ to request the storage device 200 to perform the command.

In S62, the host 100 may update a submission queue tail pointer SQTP, and may provide the updated submission queue tail pointer SQTP to the storage device 200. The storage device 200 may store the updated submission queue tail pointer SQTP in a doorbell register 202.

In S63, the storage device 200 may fetch a command from the submission queue SQ.

In S64, the storage device 200 may process the fetched command.

In S65, after processing the command, the storage device 200 may record that the processing of the command is completed in a completion queue CQ. For example, the storage device 200 may record a completion queue entry in the completion queue CQ. In this case, a completion queue head pointer CQHP may updated.

In S66, the storage device 200 may generate an interrupt signal.

In S67, the host 100 may complete the command.

In S68, the host 100 may provide the updated completion queue head pointer CQHP to the storage device 200. The storage device 200 may store the updated completion queue head pointer CQHP in the doorbell register 202.

According to an example embodiment, the host 100 may allocate HMB regions, may generate an HMDL including information on the allocated HMB regions, and may provide a set feature command for setting the HMB regions using a command queue interface to the storage device 200. The storage device 200 may fetch the HMDL from the host 100 in response to the set feature command. The host 100 may support different attributes for each of the HMB regions, and the storage device 200 may use an HMB region having various attributes with reference to the HMDL.

Figure 17:
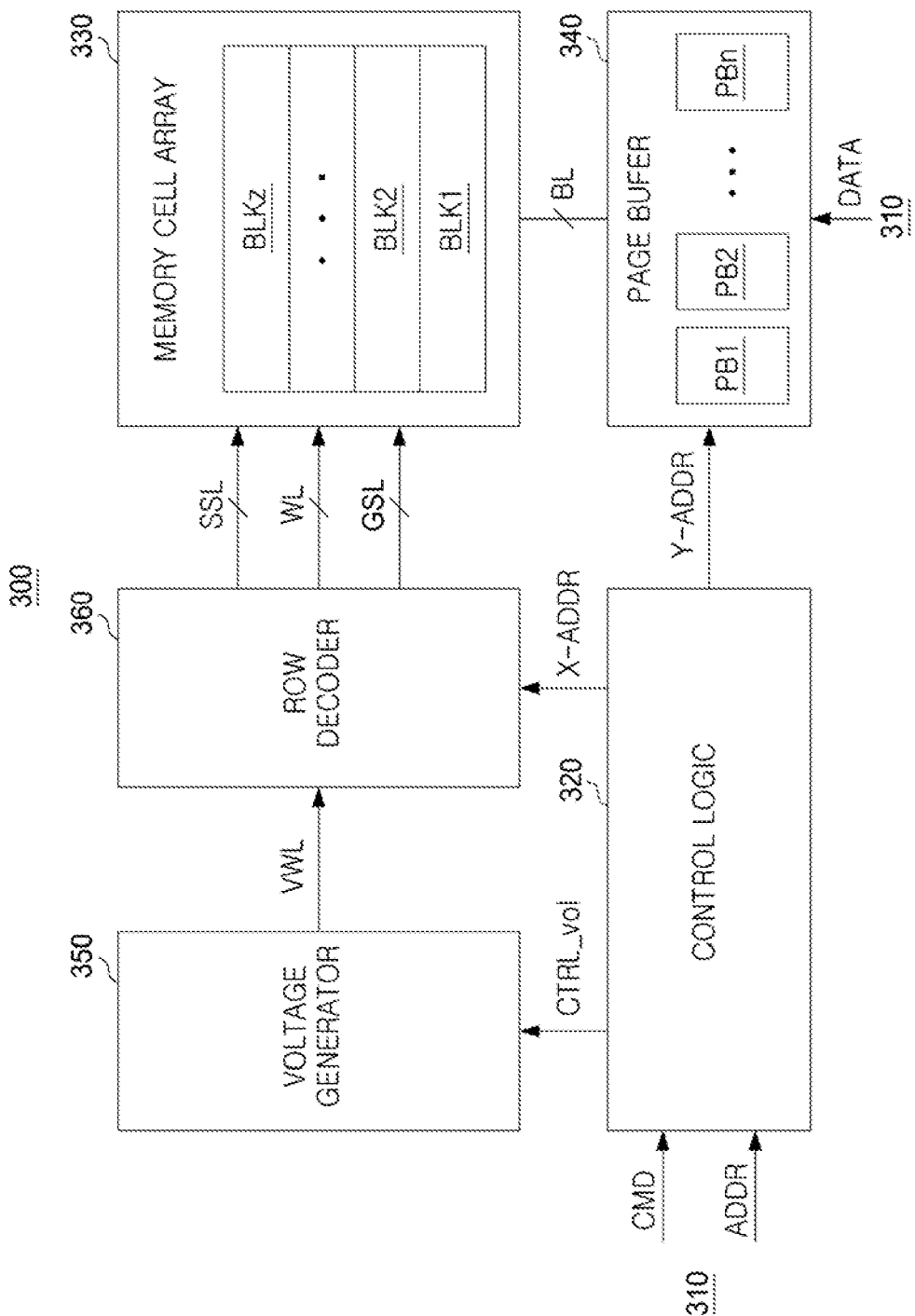

FIG. 17 is an example block view illustrating a memory device.

Referring to FIG. 17, a memory device 300 may include a control logic circuit 320, a memory cell array 330, a page buffer 340, a voltage generator 350, and a row decoder 360. The memory device 300 may further include a memory interface circuit 310 illustrated in FIG. 17, and further include a column logic, a pre-decoder, a temperature sensor, a command decoder, an address decoder, and the like, although not illustrated in FIG. 17. The memory device 300 of FIG. 17 may correspond to the non-volatile memory 220 described with reference to FIG. 1.

The control logic circuit 320 may generally control various operations in the memory device 300. The control logic circuit 320 may output various control signals in response to a command CMD and/or an address ADDR from the memory interface circuit 310. For example, the control logic circuit 320 may output a voltage control signal CTRL vol, a row address X-ADDR, and a column address Y-ADDR.

The memory cell array 330 may include a plurality of memory blocks BLK1 to BLKz (where, z is a positive integer), and each of the plurality of memory blocks BLK1 to BLKz may include a plurality of memory cells. The memory cell array 330 may be connected to the page buffer 340 through bit lines BL, and may be connected to the row decoder 360 through word lines WL, string select lines SSL, and ground select lines GSL.

In an example embodiment, the memory cell array 330 may include a 3D memory cell array, and the 3D memory cell array may include a plurality of NAND strings. Each of the NAND strings may include memory cells respectively connected to word lines stacked vertically on a substrate.

The page buffer 340 may include a plurality of page buffers PB1 to PBn (where, n is an integer greater than or equal to 3), and the plurality of page buffers PB1 to PBn may be respectively connected to memory cells through a plurality of bit lines BL. The page buffer 340 may select at least one bit line among the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed to a selected bit line. During a read operation, the page buffer 340 may sense data stored in the memory cell by sensing a current or a voltage of the selected bit line.

The voltage generator 350 may generate various types of voltages for performing program, read, and erase operations, based on the voltage control signal CTRL vol. For example, the voltage generator 350 may generate a program voltage, a read voltage, a program verify voltage, an erase voltage, or the like, as a word line voltage VWL.

The row decoder 360 may select one of the plurality of word lines WL in response to the row address X-ADDR, and may select one of the plurality of string select lines SSL. For example, the row decoder 360 may apply a program voltage and a program verify voltage to a selected word line during the program operation, and may apply a read voltage to the selected word line during the read operation.

Figure 18:
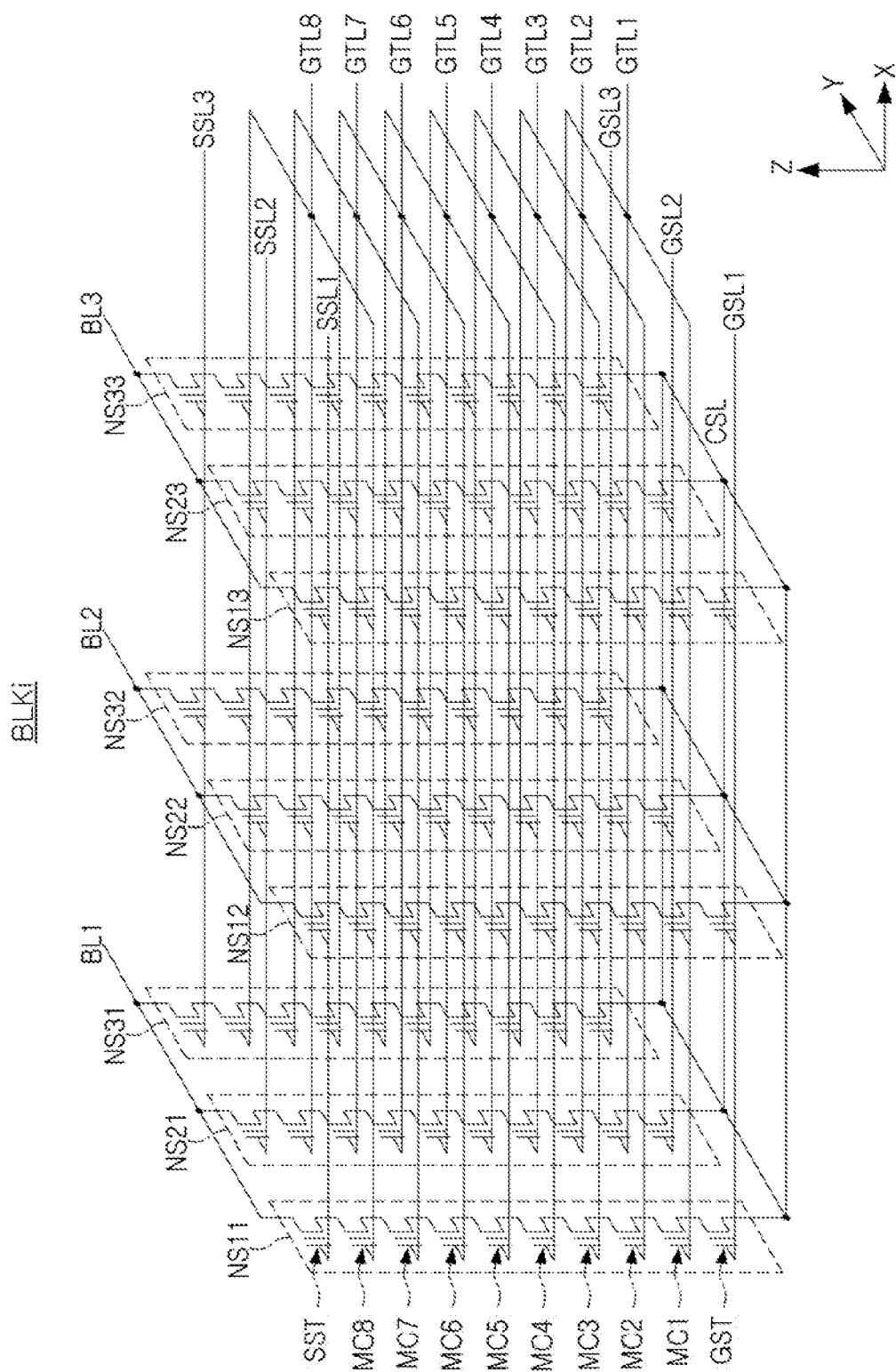

FIG. 18 is a view illustrating a 3D V-NAND structure applicable to a memory device according to an example embodiment.

When a storage module of a memory device may be implemented as a 3D V-NAND type flash memory, a plurality of memory blocks constituting the storage module may be respectively represented by an equivalent circuit as illustrated in FIG. 18.

A memory block BLKi illustrated in FIG. 18 may represent a three-dimensional memory block formed on a substrate in a three-dimensional structure. For example, a plurality of memory NAND strings included in the memory block BLKi may be formed in a direction that is perpendicular to the substrate.

Referring to FIG. 18, the memory block BLKi may include a plurality of memory NAND strings NS11 to NS33 connected between bit lines BL1, BL2, and BL3 and a common source line CSL. Each of the plurality of memory NAND strings NS11 to NS33 may include a string select transistor SST, a plurality of memory cells MC1, MC2, . . . , MC8, and a ground select transistor GST. Although it is illustrated in FIG. 18 that each of the plurality of memory NAND strings NS11 to NS33 includes eight memory cells MC1, MC2, . . . , MC8, this may be varied.

The string select transistor SST may be connected to string select lines SSL1, SSL2, and SSL3 corresponding thereto. The plurality of memory cells MC1, MC2, . . . , MC8 may be respectively connected to gate lines GTL1, GTL2, GTL8 corresponding thereto. The gate lines GTL1, GTL2, GTL8 may correspond to word lines, and a portion of the gate lines GTL1, GTL2, GTL8 may correspond to dummy word lines. The ground select transistor GST may be connected to ground select lines GSL1, GSL2, and GSL3 corresponding thereto. The string select transistor SST may be connected to the bit lines BL1, BL2, and BL3 corresponding thereto, and the ground select transistor GST may be connected to the common source line CSL.

Word lines having the same height (e.g., WL1) may be commonly connected, and the ground selection lines GSL1, GSL2, and GSL3 and the string select lines SSL1, SSL2, and SSL3 may be separated from each other. In FIG. 18, the memory block BLKi is illustrated as being connected to eight gate lines GTL1, GTL2, GTL8 and three bit lines BL1, BL2, BL3, but this may be varied.

Figure 19:
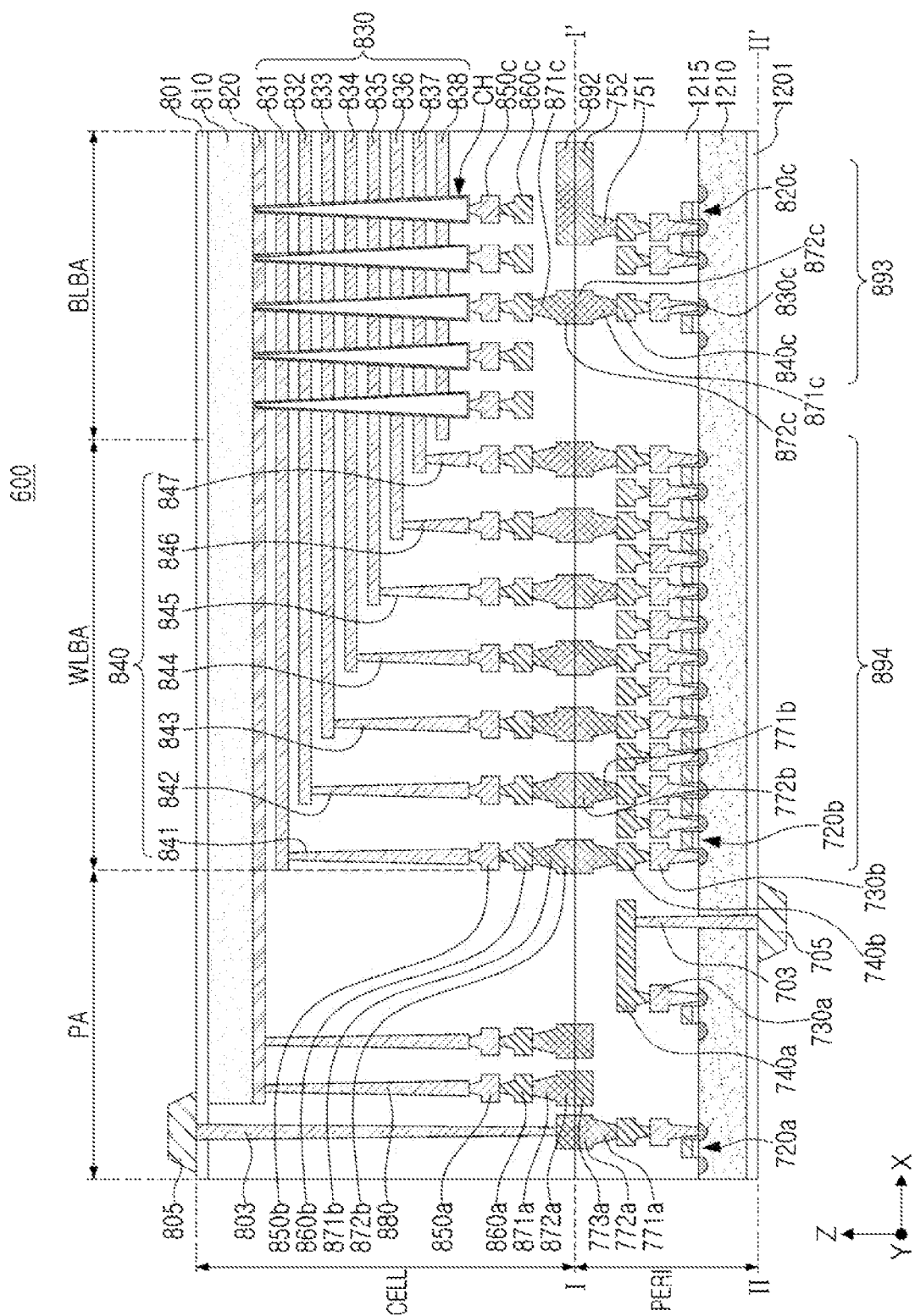

FIG. 19 is a cross-sectional view illustrating a memory device according to an example embodiment.

Referring to FIG. 19, a memory device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then bonding the upper chip and the lower chip to each other by a bonding process. For example, the bonding process may refer to a method of electrically connecting a bonding metal formed on an uppermost metal layer of the upper chip and a bonding metal formed on an uppermost metal layer of the lower chip. For example, when the bonding metal is formed of copper (Cu), the bonding method may be a Cu—Cu bonding method. The bonding metal may also be formed of aluminum or tungsten.

Each of the peripheral circuit region PERI and the cell region CELL of the memory device 600 may include an external pad bonding area PA, a word line bonding area WLBA, and a bit line bonding area BLBA. The peripheral circuit region PERI may include a first substrate 710, an interlayer insulating layer 715, a plurality of circuit elements 720a, 720b, and 720c formed on the first substrate 710, first metal layers 730a, 730b, and 730c respectively connected to the plurality of circuit elements 720a, 720b, and 720c, and second metal layers 740a, 740b, and 740c formed on the first metal layers 730a, 730b, and 730c. In an example embodiment, the first metal layers 730a, 730b, and 730c may be formed of tungsten having relatively high electrical resistivity, and the second metal layers 740a, 740b, and 740c may be formed of copper having relatively low electrical resistivity.

The interlayer insulating layer 715 may be disposed on the first substrate 710 and cover the plurality of circuit elements 720a, 720b, and 720c, the first metal layers 730a, 730b, and 730c, and the second metal layers 740a, 740b, and 740c. The interlayer insulating layer 715 may include an insulating material such as silicon oxide, silicon nitride, or the like.

Lower bonding metals 771b and 772b may be formed on the second metal layer 740b in the word line bonding area WLBA. In the word line bonding area WLBA, the lower bonding metals 771b and 772b in the peripheral circuit region PERI may be electrically bonded to upper bonding metals 871b and 872b of the cell region CELL. The lower bonding metals 771b and 772b and the upper bonding metals 871b and 872b may be formed of aluminum, copper, tungsten, or the like. The upper bonding metals 871b and 872b of the cell region CELL may be referred to as first metal pads, and the lower bonding metals 771b and 772b of the peripheral circuit region PERI may be referred to as second metal pads.

The cell region CELL may include at least one memory block. The cell region CELL may include a second substrate 810 and a common source line 820. On the second substrate 810, a plurality of word lines 831 to 838 (i.e., 830) may be stacked in a direction (the Z-axis direction), perpendicular to an upper surface of the second substrate 810. At least one string select line and at least one ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction (the Z-axis direction), perpendicular to the upper surface of the second substrate 810, and pass through the plurality of word lines 830, the at least one string select line, and the at least one ground select line. The channel structure CH may include a data storage layer, a channel layer, a buried insulating layer, and the like, and the channel layer may be electrically connected to a first metal layer 850c and a second metal layer 860c. For example, the first metal layer 850c may be a bit line contact, and the second metal layer 860c may be a bit line. In an example embodiment, the bit line 860c may extend in the first direction (the Y-axis direction), parallel to the upper surface of the second substrate 810.

In the embodiment illustrated in FIG. 19, an area in which the channel structure CH, the bit line 860c, and the like are disposed may be defined as the bit line bonding area BLBA. In the bit line bonding area BLBA, the bit line 860c may be electrically connected to the circuit elements 720c providing a page buffer 893 in the peripheral circuit region PERI. The bit line 860c may be connected to upper bonding metals 871c and 872c in the cell region CELL, and the upper bonding metals 871c and 872c may be connected to lower bonding metals 771c and 772c connected to the circuit elements 720c of the page buffer 893.

In the word line bonding area WLBA, the word lines 830 may extend in a second direction (an X-axis direction), parallel to the upper surface of the second substrate 810 and perpendicular to the first direction, and may be connected to a plurality of cell contact plugs 841 to 847 (i.e., 840). The plurality of word lines 830 and the plurality of cell contact plugs 840 may be connected to each other in pads provided by at least a portion of the plurality of word lines 830 extending in different lengths in the second direction. A first metal layer 850b and a second metal layer 860b may be connected to an upper portion of the plurality of cell contact plugs 840 connected to the plurality of word lines 830, sequentially. The plurality of cell contact plugs 840 may be connected to the peripheral circuit region PERI by the upper bonding metals 871b and 872b of the cell region CELL and the lower bonding metals 771b and 772b of the peripheral circuit region PERI in the word line bonding area WLBA.

The plurality of cell contact plugs 840 may be electrically connected to the circuit elements 720b forming a row decoder 894 in the peripheral circuit region PERI. In an embodiment, operating voltages of the circuit elements 720b of the row decoder 894 may be different than operating voltages of the circuit elements 720c forming the page buffer 893. For example, operating voltages of the circuit elements 720c forming the page buffer 893 may be greater than operating voltages of the circuit elements 720b forming the row decoder 894.

A common source line contact plug 880 may be disposed in the external pad bonding area PA. The common source line contact plug 880 may be formed of a conductive material such as a metal, a metal compound, polysilicon, or the like, and may be electrically connected to the common source line 820. A first metal layer 850a and a second metal layer 860a may be stacked on an upper portion of the common source line contact plug 880, sequentially. For example, an area in which the common source line contact plug 880, the first metal layer 850a, and the second metal layer 860a are disposed may be defined as the external pad bonding area PA.

Input/output pads 705 and 805 may be disposed in the external pad bonding area PA. Referring to FIG. 19, a lower insulating film 701 covering a lower surface of the first substrate 710 may be formed below the first substrate 710, and a first input/output pad 705 may be formed on the lower insulating film 701. The first input/output pad 705 may be connected to at least one of the plurality of circuit elements 720a, 720b, and 720c disposed in the peripheral circuit region PERI through a first input/output contact plug 703, and may be separated from the first substrate 710 by the lower insulating film 701. In addition, a side insulating film may be disposed between the first input/output contact plug 703 and the first substrate 710 to electrically separate the first input/output contact plug 703 and the first substrate 710.

Referring to FIG. 19, an upper insulating film 801 covering the upper surface of the second substrate 810 may be formed on the second substrate 810, and a second input/output pad 805 may be disposed on the upper insulating film 801. The second input/output pad 805 may be connected to at least one of the plurality of circuit elements 720a, 720b, and 720c disposed in the peripheral circuit region PERI through a second input/output contact plug 803.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 600 may include a lower metal pattern 773a, corresponding to an upper metal pattern 872a formed in an uppermost metal layer of the cell region CELL, and having the same cross-sectional shape as the upper metal pattern 872*a* of the cell region CELL so as to be connected to each other, in an uppermost metal layer of the peripheral circuit region PERI. In the peripheral circuit region PERI, the lower metal pattern 773*a* formed in the uppermost metal layer of the peripheral circuit region PERI may not be connected to a contact. Similarly, in the external pad bonding area PA, an upper metal pattern, corresponding to the lower metal pattern formed in an uppermost metal layer of the peripheral circuit region PERI, and having the same shape as the lower metal pattern of the peripheral circuit region PERI, may be formed in an uppermost metal layer of the cell region CELL.

The lower bonding metals 771*b* and 772*b* may be formed on the second metal layer 740*b* in the word line bonding area WLBA. In the word line bonding area WLBA, the lower bonding metals 771*b* and 772*b* of the peripheral circuit region PERI may be electrically connected to the upper bonding metals 871*b* and 872*b* of the cell region CELL by bonding.

Further, in the bit line bonding area BLBA, an upper metal pattern 892, corresponding to a lower metal pattern 752 formed in the uppermost metal layer of the peripheral circuit region PERI, and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In the example embodiment, a reinforced metal pattern, corresponding to a metal pattern formed on the uppermost metal layer of one of the cell region CELL and the peripheral circuit region PERI, and having the same cross-sectional shape as a metal pattern formed on the uppermost metal layer of the other one of the cell region CELL and the peripheral circuit region PERI, may be formed. A contact may not be formed in the reinforced metal pattern.

Figure 20:
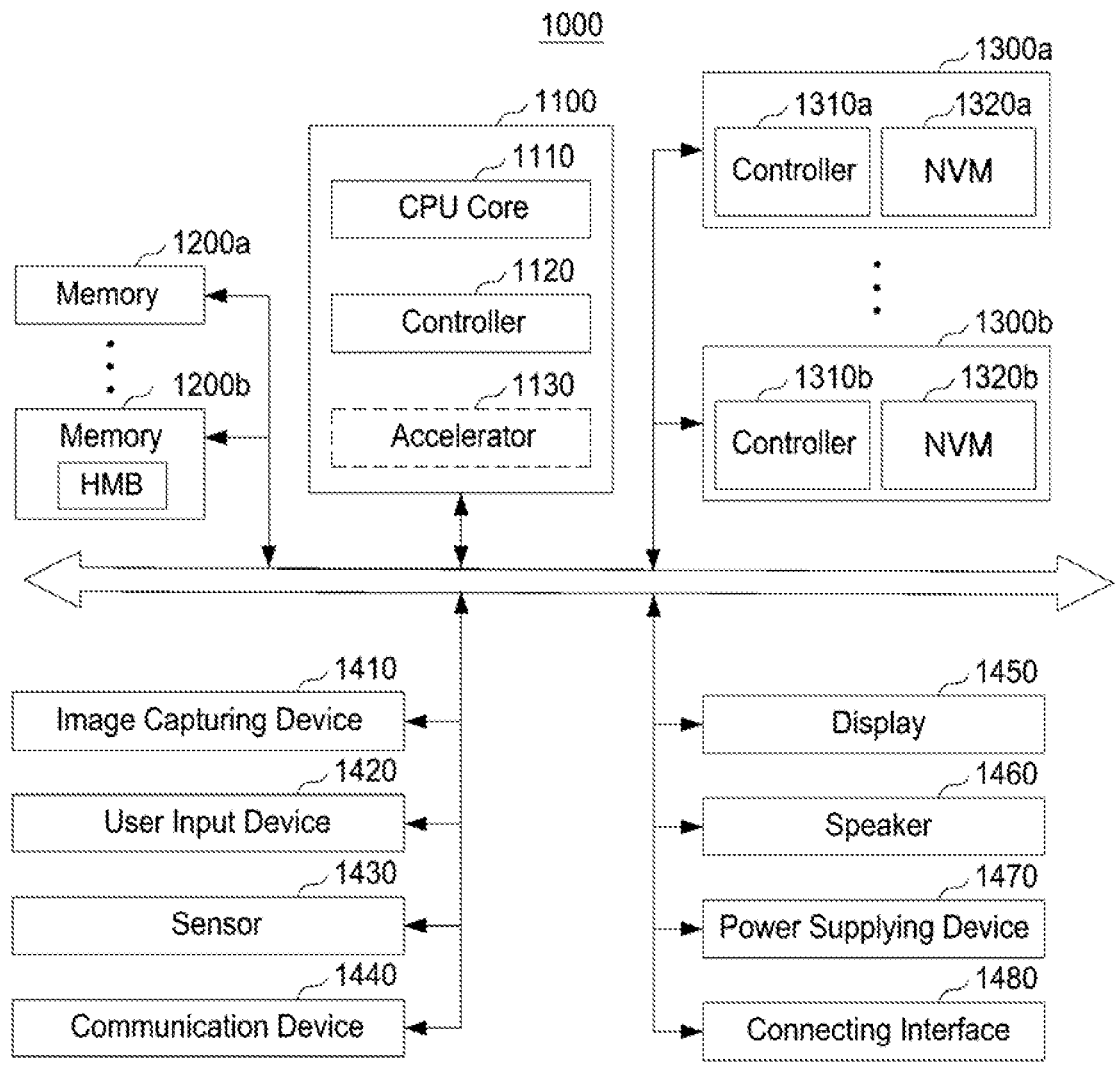

FIG. 20 is a view illustrating a system 1000 to which a storage device according to an example embodiment is applied.

The system 1000 of FIG. 20 may be a mobile system, such as a mobile phone, a smartphone, a tablet personal computer (PC), a wearable device, a healthcare device, or an internet-of-things (JOT) device. The system 1000 of FIG. 20 may also be for a vehicle, a personal computer, a laptop computer, a server, a media player, an automotive device such as a navigation system, or the like.

Referring to FIG. 20, the system 1000 may include a main processor 1100, memories 1200*a* and 1200*b*, and storage devices 1300*a* and 1300*b*, and may further include at least one of an image capturing device. 1410, a user input device 1420, a sensor 1430, a communication device 1440, a display 1450, a speaker 1460, a power supplying device 1470, or a connecting interface 1480.

The main processor 1100 may control an overall operation of the system 1000, and more specifically, operations of other components constituting the system 1000. The main processor 1100 may be implemented as a general-purpose processor, a dedicated processor, an application processor, or the like.

The main processor 1100 may include at least one CPU core 1110 and may further include a controller 1120 for controlling the memories 1200*a* and 1200*b* and/or the storage devices 1300*a* and 1300*b*. According to an example embodiment, the main processor 1100 may further include an accelerator 1130 that may be a dedicated circuit for high-speed data operation such as artificial intelligence (AI) data operation. The accelerator 1130 may include a graphics processing unit (GPU), a neural processing unit (NPU), and/or a data processing unit (DPU), or the like, and may be implemented as a separate chip, physically independent from other components of the main processor 1100.

The memories 1200*a* and 1200*b* may be used as a main memory device of the system 1000, and may include volatile memories such as SRAM and/or DRAM, or the like, but may also include non-volatile memories such as flash memory, PRAM, and/or RRAM, or the like. The memories 1200*a* and 1200*b* may be implemented together with the main processor 1100 in the same package.

The storage devices 1300*a* and 1300*b* may function as non-volatile storage devices that store data regardless of whether power is supplied or not, and may have a relatively larger storage capacity, as compared to the memories 1200*a* and 1200*b*. The storage devices 1300*a* and 1300*b* may include storage controllers 1310*a* and 1310*b*, and non-volatile memories (NVM) 1320*a* and 1320*b* for storing data under control of the storage controllers 1310*a* and 1310*b*. The non-volatile memories 1320*a* and 1320*b* may include a flash memory having a 2D (2-dimensional) structure or a 3D (3-dimensional) vertical NAND (V-NAND) structure, but may include other types of non-volatile memory such as PRAM and/or RRAM, or the like.

The storage devices 1300*a* and 1300*b* may be included in the system 1000 in a state physically separated from the main processor 1100, or may be implemented together with the main processor 1100 in the same package. In addition, the storage devices 1300*a* and 1300*b* may have a shape such as a solid state device (SSD) or a memory card, to be detachably coupled to other components of the system 1000 through an interface such as a connecting interface 1480 to be described later. Such storage devices 1300*a* and 1300*b* may be devices to which standard protocols such as a universal flash storage (UFS), an embedded multi-media card (eMMC), or a non-volatile memory express (NVMe) are applied, for example.

At least a portion of the memories 1200*a* and 1200*b* may provide an HMB region for operations of the storage devices 1300*a* and 1300*b*. According to an example embodiment, the main processor 1100 may allocate a plurality of HMB regions having various attributes, and may provide the plurality of HMB regions to the storage devices 1300*a* and 1300*b*, to improve performance of the storage devices 1300*a* and 1300*b*.

The memories 1200*a* and 1200*b* may further store an identifier that may indicate to which each of the plurality of HMB regions is allocated for one of the storage devices 1300*a* and 1300*b*. For example, a universally unique identifier (UUID) may be used to identify the storage devices 1300*a* and 1300*b*, and the memories 1200*a* and 1200*b* may store the UUID for each of the HMB regions. The main processor 1100 may identify the HMB regions allocated to different storage devices 1300*a* and 1300*b* with reference to the UUID. Then, when the storage devices 1300*a* and 1300*b* are electrically disconnected from and then reconnected to the system 1000, the main processor 1100 may identify the storage device and may reallocate the HMB regions allocated for the storage devices.

The image capturing device 1410 may capture a still image or a moving image, and may be a camera, a camcorder, and/or a webcam, or the like. According to an example embodiment, the main processor 1100 may continuously store frame data generated by the image capturing device 1410 in an HMB region having a stream attribute among the plurality of HMB regions. The storage devices 1300*a* and 1300*b* may periodically access the HMB region to acquire frame data, and may store the frame data in the non-volatile memories 1320a and 1320b. Data traffic between the main processor 1100 and the storage devices 1300a and 1300b may decrease.

The user input device 1420 may receive various types of data of the system 1000, input by a user, and may be a touch pad, a keypad, a keyboard, a mouse, and/or a microphone, or the like.

The sensor 1430 may detect various types of physical quantities that may be acquired from the outside of the system 1000, and may convert the sensed physical quantities into electrical signals. Such a sensor 1430 may be a temperature sensor, a pressure sensor, an illuminance sensor, a position sensor, an acceleration sensor, a biosensor, and/or a gyroscope sensor, or the like.

The communication device 1440 may transmit and receive signals between other devices outside the system 1000 according to various communication protocols. Such a communication device 1440 may be implemented to include an antenna, a transceiver, and/or a modem, or the like.

The display 1450 and the speaker 1460 may function as output devices that respectively output visual information and auditory information to the user of the system 1000.

The power supplying device 1470 may appropriately convert power supplied from a battery (not illustrated) mounted in the system 1000 and/or an external power source, and may supply the converted power to each of the components of the system 1000.

The connecting interface 1480 may provide a connection between the system 1000 and an external device that may be connected to the system 1000 and may exchange data with the system 1000. The connecting interface 1480 may be implemented in various interface methods such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), NVMe, IEEE 1394, a universal serial bus (USB), a secure digital (SD) card, a multi-media card (MMC), an eMMC, a UFS, an embedded universal flash storage (eUFS), a compact flash (CF) card interface, or the like.

As described above, example embodiments may provide configurations and operations related to a storage device capable of using a host memory of a host as a buffer to manage various pieces of data.

According to an example embodiment, buffered data may be selectively maintained according to an attribute of an HMB region when releasing the HMB region, and a host memory may be efficiently used.

According to an example embodiment, a non-volatile memory of a host may be allocated in a storage device as an HMB region, and operation data of the storage device may be stored in the host even when the storage device and the host are powered off. Therefore, a power-on time of the storage device may be reduced.

According to an example embodiment, data continuously generated by a host may be updated in an HMB region, and the data of the HMB region may be periodically stored in a non-volatile memory in a storage device. Therefore, data traffic between the host and the storage device may be reduced.

According to an example embodiment, a plurality of host memory buffer (HMB) regions having different attributes may be allocated in a host memory, a storage device may buffer data in the plurality of HMB regions according to the attributes thereof, and the buffered data may be selectively maintained according to an attribute of each of the HMB regions when releasing the HMB regions.

According to an example embodiment, data generated by a host may be stored in an HMB region according to an attribute of the HMB region, and a storage device may acquire data of the HMB region.

According to an example embodiment, a host memory may include a non-volatile memory region, and at least a portion of the HMB regions may be allocated in the non-volatile memory region. Data of an HMB region allocated in the non-volatile memory region may be maintained even after a host is shut down.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electronic system, comprising:
a host including a host memory; and
a storage device that is configured to store data from the host, wherein:
the host is configured to allocate a first host memory buffer (HMB) region and a second HMB region having respectively different attributes in the host memory, and to provide a host memory descriptor list (HMDL) including address information and attribute information of each of the first and second HMB regions to the storage device,
the storage device is configured to buffer data in the first and second HMB regions with reference to the HMDL, and
the host is configured to release the first and second HMB regions, and to provide data buffered in the first HMB region to the storage device and maintain data buffered in the second HMB region in the host memory, according to an attribute of each of the first and second HMB regions.

2. The electronic system as claimed in claim 1, wherein, after releasing the first and second HMB regions, the host converts the storage device to a non-active mode.

3. The electronic system as claimed in claim 2, wherein the host is configured to convert the storage device from the non-active mode to an active mode, and to reallocate the released first and second HMB regions, and the storage device is configured to control a memory device therein using data maintained in the second HMB region.

4. The electronic system as claimed in claim 3, wherein the storage device is configured to buffer again the data buffered in the first HMB region and then provided to the storage device in the reallocated first HMB region, and to control the memory device using data buffered in the first HMB region.

5. The electronic system as claimed in claim 2, wherein, after storing the address information of the second HMB region in the host memory, the host converts the storage device to the non-active mode, converts the storage device from the non-active mode to an active mode, and reallocates the second HMB region with reference to the address information.

6. The electronic system as claimed in claim 1, wherein:
the host is configured to allocate a third HMB region having an attribute, different from the attributes of the first and second HMB regions, in the host memory,
the HMDL further includes attribute information of the third HMB region, and the HMDL is stored in the host memory, and
the host is configured to store streaming data, periodically generated from a CPU core therein, in the third HMB region with reference to the HMDL.

7. The electronic system as claimed in claim 6, wherein the storage device is configured to access the third HMB region in a second period, longer than a first period in which the streaming data is stored in the third HMB region, in order to acquire the streaming data, and to store the acquired streaming data in a non-volatile memory therein.

8. The electronic system as claimed in claim 6, further comprising an imaging device that is configured to periodically generate frame data,
wherein the CPU core is configured to generate the streaming data using the frame data.

9. The electronic system as claimed in claim 1, wherein:
the host memory includes a volatile memory region and a non-volatile memory region,
the host is configured to allocate the first and second HMB regions in the volatile memory region, and to allocate a fourth HMB region having an attribute, different from the attributes of the first and second HMB regions, in the non-volatile memory region, and
the storage device is configured to buffer data in the fourth HMB region, based on the attributes of the first, second, and fourth HMB regions.

10. The electronic system as claimed in claim 9, wherein the host is configured to generate address information of the fourth HMB region, to store the address information in the non-volatile memory region, and to power off the electronic system.

11. The electronic system as claimed in claim 10, wherein:
the host is configured to reallocate the fourth HMB region based on the address information stored in the non-volatile memory region, when the electronic system is powered on, and
the storage device is configured to control a memory device therein using data maintained in the reallocated fourth HMB region.

12. The electronic system as claimed in claim 9, wherein the host is configured to map the volatile memory region and the non-volatile memory region on one memory map.

13. The electronic system as claimed in claim 1, wherein:
the host is configured to allocate a fifth HMB region having an attribute, different from the attributes of the first and second HMB regions, in the host memory, and to periodically update a system time of the host in the fifth HMB region, and
the storage device is configured to acquire the system time of the host from the fifth HMB region, and to synchronize a system time of the storage device with the system time of the host, based on the acquired system time.

14. The electronic system as claimed in claim 13, wherein:
the storage device includes a timer, and
the storage device is configured to stop an operation of the timer in a non-active mode, and to acquire the system time from the fifth HMB region after converting from the non-active mode to an active mode.

15. The electronic system as claimed in claim 1, wherein:
the host is configured to allocate a sixth HMB region having an attribute, different from the attributes of the first and second HMB regions, in the host memory, wherein the HMDL further includes attribute information of the sixth HMB region, and
the storage device is configured to generate log data when an error occurs, to store the log data in the sixth HMB region with reference to the HMDL, and to then terminate operation of the storage device.

16. The electronic system as claimed in claim 15, wherein the host is configured to acquire log data from the sixth HMB region in a state in which the storage device operation is terminated, and to use the acquired log data to analyze an error of the storage device.

17. An electronic system, comprising:
a host including a host memory; and
a storage device that is configured to store data from the host, wherein:
the host is configured to allocate a first host memory buffer (HMB) region and a second HMB region having respectively different attributes in the host memory,
the storage device is configured to buffer data in the first and second HMB regions with reference to the attributes of the first and second HMB regions, and
the host is configured to release the first and second HMB regions, and to selectively provide data buffered in the first and second HMB regions to the storage device, according to an attribute of each of the first and second HMB regions.

* * * * *